(12) United States Patent
Kim et al.

(10) Patent No.: US 11,360,569 B2
(45) Date of Patent: *Jun. 14, 2022

(54) ELECTRONIC DEVICE, WEARABLE DEVICE, AND METHOD FOR CONTROLLING OBJECT DISPLAYED THROUGH ELECTRONIC DEVICE

(71) Applicant: Samsung Electronics Co., Ltd., Gyeonggi-do (KR)

(72) Inventors: Young-Ri Kim, Gyeonggi-do (KR); Sung-Hyo Jeong, Seoul (KR); Oh-Yoon Kwon, Seoul (KR); Seo-Young Yoon, Seoul (KR); Yoo-Jin Hong, Gyeonggi-do (KR); Joo-Kyung Woo, Gyeonggi-do (KR); Eun-Jung Lee, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/088,106

(22) Filed: Nov. 3, 2020

(65) Prior Publication Data

US 2021/0048890 A1 Feb. 18, 2021

Related U.S. Application Data

(63) Continuation of application No. 15/343,732, filed on Nov. 4, 2016, now Pat. No. 10,824,236.

(30) Foreign Application Priority Data

Nov. 4, 2015 (KR) .................. 10-2015-0154732

(51) Int. Cl.
*G06F 3/01* (2006.01)
*G06F 3/048* (2013.01)
(Continued)

(52) U.S. Cl.
CPC .............. *G06F 3/017* (2013.01); *G06F 1/163* (2013.01); *G06F 3/012* (2013.01); *G06F 3/0346* (2013.01);
(Continued)

(58) Field of Classification Search
CPC .............. G06F 3/0482; G06F 3/04817; G06F 3/04848; G06F 3/0483; G06F 13/117; G06F 13/344
See application file for complete search history.

(56) References Cited

U.S. PATENT DOCUMENTS 6,031,531 A 2/2000 Kimble
9,110,562 B1 8/2015 Eldawy
(Continued)

FOREIGN PATENT DOCUMENTS

| CN | 102763061 | 10/2012 |
|---|---|---|
| WO | WO 2014/158633 | 10/2014 |
| WO | WO 2014/168901 | 10/2014 |

OTHER PUBLICATIONS

International Search Report dated Feb. 1, 2017 issued in counterpart application No. PCT/KR2016/012693, 9 pages.
(Continued)

*Primary Examiner* — Pei Yong Weng
(74) *Attorney, Agent, or Firm* — The Farrell Law Firm, P.C.

(57) ABSTRACT

Disclosed are an electronic device and method for controlling objects displayed through the electronic device. The method includes sensing a movement of the electronic device, outputting a stereoscopic image on a display of the electronic device, moving a first object from a first position to a second position corresponding to the sensed movement in the stereoscopic image, and moving one of the first object and a second object into a position of the other object.

14 Claims, 25 Drawing Sheets

(51) Int. Cl.
    *G06F 3/0487* (2013.01)
    *G06F 3/04812* (2022.01)
    *G06F 3/0482* (2013.01)
    *G06F 3/04817* (2022.01)
    *G06F 3/04847* (2022.01)
    *G06F 3/0483* (2013.01)
    *H04N 13/117* (2018.01)
    *H04N 13/344* (2018.01)
    *H04N 13/398* (2018.01)
    *G06F 1/16* (2006.01)
    *G06F 3/0346* (2013.01)
    *G06F 3/04842* (2022.01)

(52) U.S. Cl.
    CPC ............ *G06F 3/048* (2013.01); *G06F 3/0482* (2013.01); *G06F 3/0483* (2013.01); *G06F 3/0487* (2013.01); *G06F 3/04812* (2013.01); *G06F 3/04817* (2013.01); *G06F 3/04842* (2013.01); *G06F 3/04847* (2013.01); *H04N 13/117* (2018.05); *H04N 13/344* (2018.05); *H04N 13/398* (2018.05); *G06F 2203/0381* (2013.01); *G06F 2203/04803* (2013.01)

(56) References Cited

U.S. PATENT DOCUMENTS

| | | |
|---|---|---|
| 10,824,236 B2 * | 11/2020 | Kim .................... G06F 1/163 |
| 2002/0163543 A1 | 11/2002 | Oshikiri |
| 2003/0043198 A1 | 3/2003 | Delpuch |
| 2006/0247855 A1 | 11/2006 | de Silva |
| 2011/0074918 A1 | 3/2011 | Klappert |
| 2013/0141360 A1 | 6/2013 | Compton et al. |
| 2013/0335303 A1 | 12/2013 | Maciocci et al. |
| 2015/0138074 A1 | 5/2015 | Hennelly et al. |
| 2015/0156803 A1 | 6/2015 | Ballard et al. |
| 2015/0205494 A1 | 7/2015 | Scott et al. |
| 2015/0212322 A1 | 7/2015 | Moravetz |
| 2015/0235426 A1 | 8/2015 | Lyons |
| 2015/0261318 A1 | 9/2015 | Scavezze et al. |

OTHER PUBLICATIONS

European Search Report dated Mar. 16, 2017 issued in counterpart application 16197180.9-1972, 10 pages.

Chinese Office Action dated Sep. 11, 2019 issued in counterpart application No. 201680064286.7, 17 pages.

* cited by examiner

MOVE FIRST OBJECT INTO POINTER OBJECT

ELECTRONIC DEVICE, WEARABLE DEVICE, AND METHOD FOR CONTROLLING OBJECT DISPLAYED THROUGH ELECTRONIC DEVICE

PRIORITY

This application is a continuation of U.S. patent application Ser. No. 15/343,732, which was filed in the U.S. Patent and Trademark Office on Nov. 4, 2016, and claims priority under 35 U.S.C. § 119(a) to Korean Patent Application Serial No. 10-2015-0154732, which was filed in the Korean Intellectual Property Office on Nov. 4, 2015, the entire content of each of which is incorporated herein by reference.

BACKGROUND

1. Field of the Disclosure

The present disclosure relates generally to electronic devices, and more particularly, to wearable electronic devices, and methods for controlling objects displayed through such electronic devices.

2. Description of the Related Art

Many electronic devices that are wearable on the human body have been introduced. Such electronic devices are typically referred to as wearable devices and are provided in various types, such as head mounted, glasses, watches, bands, contact lenses, rings, shoes, clothes, or other manners to be worn on the human body or clothes, leading to increased portability and accessibility.

Head mounted wearable devices, such as head mounted displays (HMD) are being rapidly developed. An HMD may provide images in a see-through type providing augmented reality (AR) and in a see-closed type providing virtual reality (VR).

The see-through type may synthesize or combine a virtual object or target with a real-life base using the characteristics of a semi-transmissive lens to reinforce additional information that may be difficult to obtain otherwise. The see-closed type places two displays ahead of the user's eyes and allows the user alone to view contents, such as games, movies, streaming, or broadcast provided through an external input through an independent screen, so that the user may focus on only the contents.

Under research as per existing technology are methods allowing an electronic device such as a smartphone equipped with a separate display to be mounted on a wearable device as a display means for the wearable device.

Upon mounting an electronic device on a wearable device for use, data related to a user's entry, such as a motion acceleration, may be considered to control objects outputted through the display of the electronic device. To this point, however, the prior art is deficient in the development of wearable device technology that considers such data, giving rise to a need in the art for improvement in the control of objects outputted through the electronic device display.

SUMMARY

Aspects of the present disclosure are to address at least the above mentioned problems and/or disadvantages and to provide at least the advantages described below.

Accordingly, an aspect of the present disclosure is to provide an electronic device equipped with a display means, which may identify a user input sensed when the electronic device is mounted on a wearable device, identify an object related to the user input among objects displayed, determine that the object is intended to be selected by the user, and output the object.

According to an aspect of the present disclosure, an electronic device includes a display; a sensor that senses a movement of the electronic device; and a processor configured to display a stereoscopic image including a left-eye image and a right-eye image through the display, move a pointer object in the stereoscopic image, based on the movement of the electronic device sensed by the sensor, identify whether the pointer object is positioned between a first position and a second position for a predetermined time in the stereoscopic image, based on information obtained from the sensor, the first position being a position at which a first object is positioned, the second position being a position at which a second object is positioned, and the first object and the second object being closest to the pointer object among a plurality of objects included in the stereoscopic image, after identifying that the pointer object is positioned between the first position and the second position for the predetermined time, determine a movement direction in which the pointer object has been moved before the pointer object is positioned between the first position and the second position, determine an object positioned in the movement direction among the first and second objects, and move the pointer object into a position of the determined object.

According to another aspect of the present disclosure, a method is provided for controlling a pointer object displayed through an electronic device. The method includes outputting a stereoscopic image through a display of the electronic device; moving the pointer object in the stereoscopic image, based on a movement of the electronic device sensed by a sensor of the electronic device; identifying whether the pointer object is positioned between a first position and a second position for a predetermined time in the stereoscopic image, based on information obtained from the sensor, the first position being a position at which a first object is positioned, the second position being a position at which a second object is positioned, and the first object and the second object being closest to the pointer object among a plurality of objects included in the stereoscopic image; after identifying that the pointer object is positioned between the first position and the second position for the predetermined time, determining a movement direction in which the pointer object has been moved before the pointer object is positioned between the first position and the second position; determining an object positioned in the movement direction among the first and second objects; and moving the pointer object into a position of the determined object.

BRIEF DESCRIPTION OF THE DRAWINGS

The above and other aspects, features and advantages of the present disclosure will become better understood by reference to the following detailed description when considered in connection with the accompanying drawings, in which.

DETAILED DESCRIPTION OF EMBODIMENTS OF THE DISCLOSURE

Figure 1:
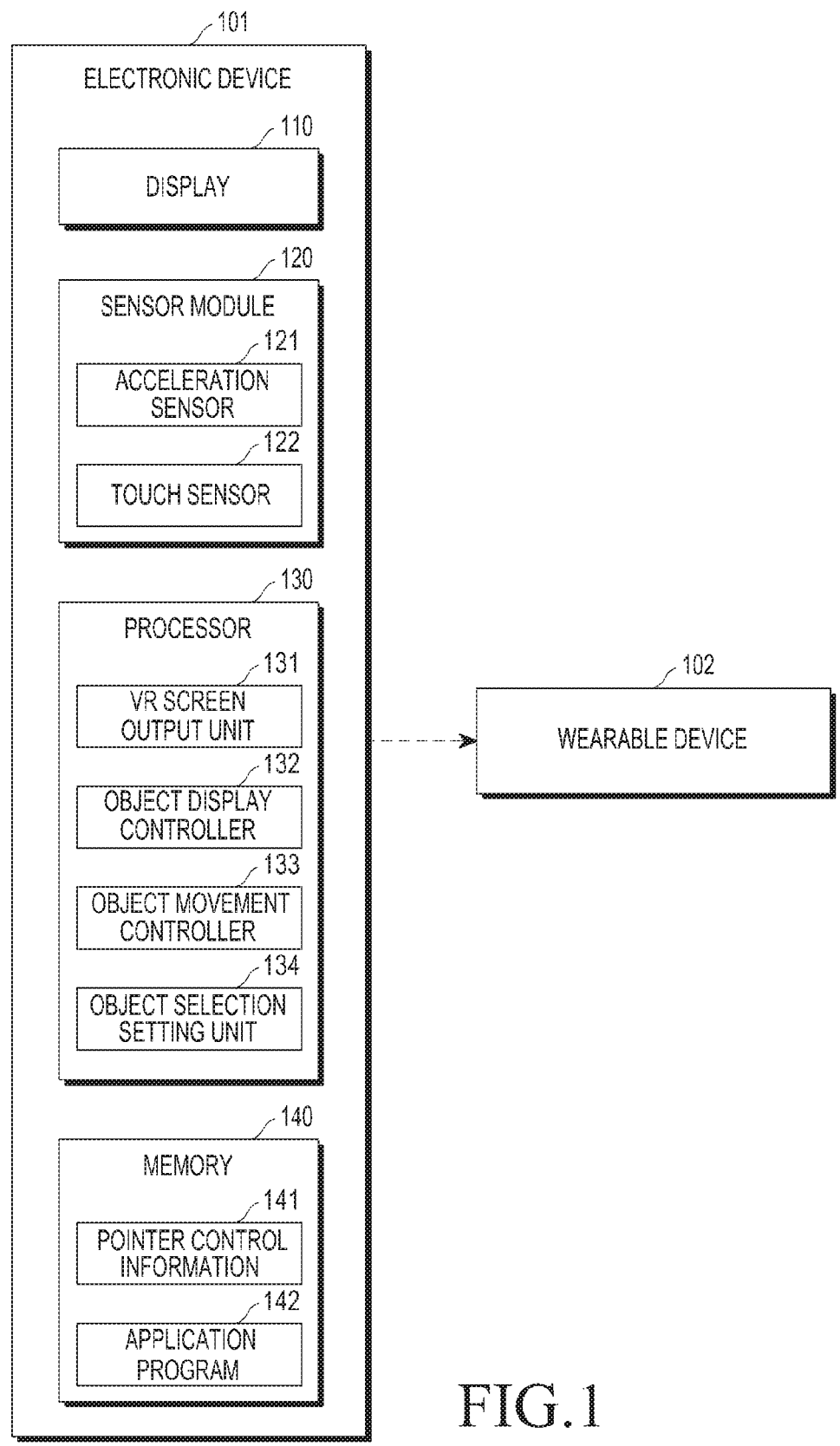
FIG. 1 illustrates a configuration of an electronic device, according to an embodiment of the present disclosure.

Embodiments of the present disclosure are described with reference to the accompanying drawings. However, it should be appreciated that the present disclosure is not limited to the embodiments, and all changes and/or equivalents or replacements thereto also pertain to the scope of the present disclosure. The same or similar reference denotations may be used to refer to the same or similar elements throughout the specification and the drawings. Descriptions of well-known functions and/or configurations will be omitted for the sake of clarity and conciseness.

As used herein, the expressions "have," "may have," "include," or "may include" a feature (e.g., a number, function, operation, or a component such as a part) indicate the existence of the feature and do not exclude the existence of other features.

As used herein, the expressions "A or B," "at least one of A and/or B," and "one or more of A and/or B" may include all possible combinations of A and B. For example, "A or B," "at least one of A and B," and "at least one of A or B" may indicate (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. A first component may be referred to as a second component, and vice versa without departing from the scope of the present disclosure.

It will be understood that when an element, such as a first element, is referred to as being operatively or communicatively "coupled with/to," or "connected with/to" another element, such as a second element, the first element can be coupled or connected with/to the second element directly or via a third element. In contrast, it will be understood that when the first element is referred to as being "directly coupled with/to" or "directly connected with/to" the second element, no third element exists between the first and second elements.

As used herein, the expression "configured (or set) to" may be interchangeably used with the expressions "suitable for," "having the capacity to," "designed to," "adapted to," "made to," or "capable of" depending on circumstances. The expression "configured (or set) to" does not essentially indicate "specifically designed in hardware to." Rather, the expression "configured to" may indicate that a device can perform an operation together with another device or parts of a device. For example, the expression "processor configured (or set) to perform A, B, and C" may indicate a generic-purpose processor, such as a central processing unit (CPU) or application processor that may perform the operations by executing one or more software programs stored in a memory device or a dedicated or embedded processor for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure pertain. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terms defined herein should not be interpreted to exclude embodiments of the present disclosure.

For example, an electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a motion pictures experts group (MPEG) layer audio 3 (MP3) player, a mobile medical device, a camera, or a wearable device.

According to an embodiment of the present disclosure, the wearable device may include at least one of an accessory-type device, such as a watch, a ring, a bracelet, an anklet, a necklace, glasses, contact lenses, or an HMD, a fabric- or clothes-integrated device such as electronic clothes, a body attaching-type device such as a skin pad or tattoo, or a body implantable device, such as an implantable circuit.

According to an embodiment of the present disclosure, the electronic device may be a home appliance such as a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices including diverse portable medical measuring devices such as a blood sugar measuring device, a heartbeat measuring device, or a body temperature measuring device, a magnetic resource angiography (MRA) device, a magnetic resource imaging (MRI) device, a computed tomography (CT) device, an imaging or an ultrasonic device, a navigation device, a global navigation satellite system (GNSS) receiver, an event data recorder (EDR), a flight data recorder (FDR), an automotive infotainment device, a sailing electronic device such as a sailing navigation device or a gyro compass, avionics, security devices, vehicular head units, industrial or home robots, automatic teller machines (ATMs), point of sales (POS) devices, or Internet of Things devices such as a light bulb, various sensors, an electric or gas meter, a sprinkler, a fire alarm, a thermostat, a street light, a toaster, fitness equipment, a hot water tank, a heater, or a boiler.

According to embodiments of the disclosure, examples of the electronic device may be at least one of part of a piece of furniture or building/structure, an electronic board, an electronic signature receiving device, a projector, or various measurement devices such as for measuring water, electricity, gas, or electromagnetic waves. The electronic device may be one or a combination of the above-listed devices, and may be a flexible electronic device. The electronic devices disclosed herein are not limited to the above-listed devices, and may include new electronic devices depending on the development of new technology.

According to an embodiment of the present disclosure, an object may be an indication outputted on a display through a stereoscopic image, and when a particular object is selected, an operation previously set for the selected object may be performed on the electronic device.

According to an embodiment of the present disclosure, a pointer object may be an object to indicate a particular object. When a preset user input is entered with the pointer object positioned in an area of a first object, an operation related to the first object may be performed on the electronic device.

According to an embodiment of the present disclosure, a movement of the electronic device may include an angle of the movement of the electronic device that is based on a preset reference position. For example, the user may wear the electronic device-mounted wearable device on his/her face and may move his/her face angle up, down, left, or right, and the electronic device may determine the movement as a movement of the electronic device.

According to an embodiment of the present disclosure, a movement of a first object to a second object may indicate that the first object goes into an area of the second object related to the first object among a plurality of objects, and the first object and the second object may be displayed overlapping each other.

Hereinafter, an electronic device, wearable device, and method for controlling an object displayed through the electronic device according to embodiments of the present disclosure are described with reference to the accompanying drawings. As used herein, the term "user" may denote a human or an artificial intelligence electronic device using the electronic device.

According to embodiments of the present disclosure, by the electronic device, wearable device, and method for controlling objects displayed through the electronic device, movements of a plurality of objects may be controlled corresponding to a sensed movement of the electronic device, and one of a first object and a second object related to the first object may be moved to the position of the other object, enabling a movement of an object to be controlled with minimal user movement.

FIG. 1 illustrates a configuration of an electronic device according to an embodiment of the present disclosure.

Referring to FIG. 1, the electronic device 101 may include a display 110, a sensor module 120, a processor 130, and a memory 140.

According to an embodiment of the present disclosure, when the electronic device 101 is mounted on a wearable device 102, the electronic device 101 may be operated in an HMD mode. When the electronic device 101 is functionally connected with the wearable device 102, an HMD mode screen may be outputted through the electronic device 101.

When the electronic device 101 is mounted on the wearable device 102 and operated in the HMD mode, the screen displayed through the display 110 may display two screens respectively corresponding to the user's left and right eyes.

The display 110 may output a VR screen when the electronic device 101 is mounted on the wearable device 102, such as in the manner of a stereoscopic image.

The sensor module 120 may include an acceleration sensor 121 sensing a movement acceleration of the electronic device 101 and a touch sensor 122 sensing a touch input, and the sensor module 120 may further include various sensors capable of sensing the movement of the electronic device 101 or another electronic device. For example, according to a movement angle of the electronic device 101, objects displayed in a VR space may be selected or a pointer object indicating that a particular object is selectable may be moved.

According to an embodiment of the present disclosure, the electronic device 101 may set a reference position in the VR space, and the sensor module 120 may sense an angle at which the electronic device 101 is moved based on the set reference position. For example, as the reference position, a position value corresponding to an angle of the electronic device 101 when the user views the front of the worn electronic device 102 may be set. Other position values as designated by the user may be set as the reference position.

The processor 130 may include a VR screen output unit 131, an object display controller 132, an object movement controller 133, and an object selection setting unit 134 and may further include various components for controlling objects displayed based on the determined user movement.

The VR screen output unit 131 may perform control to output a VR screen, such as to output a pointer object for selecting and controlling objects included in the VR screen. The pointer object may perform control to output a fixed pointer that has a fixed position on the VR screen, and a location where an object is snapped or a moving pointer moving as the electronic device 101 moves.

According to an embodiment of the present disclosure, when the electronic device 101 is determined to be mounted on the wearable device 102, the VR screen output unit 131 may perform control to output a stereoscopic image through the display 110 and to output the VR screen under other circumstances.

The object display controller 132 may perform control to display, through the display 110, a movement of a pointer object or object included in an application execution screen. For example, when a particular object is set to be selectable as per at least one reference, the object display controller 132 may display the object such that the pointer object overlaps the object.

The object movement controller 133 may control a movement of the object displayed through the VR screen based on a movement angle of the electronic device 101 sensed through the sensor module 120.

According to an embodiment of the present disclosure, the object movement controller 133 may control the movement of the object further considering a sensor input identified from the wearable device 102.

When the pointer object is rendered to have a fixed position according to the movement of the electronic device 101 sensed through the sensor module 120, and a first object of the VR screen is included in an area of the pointer object having the fixed position, the object selection setting unit 134 may determine that the first object is pointed out.

According to an embodiment of the present disclosure, when the pointer object is positioned to overlap a particular object, the object selection setting unit 134 may set such that the overlapping object may be selected. For example, upon identifying a preset input, such as a gesture input or button selection for the object set to be selectable, the object selection setting unit 134 may perform control to run an operation related to the object overlapping the pointer object.

According to an embodiment of the present disclosure, the object selection setting unit 134 may determine an object corresponding to a movement of the electronic device 101 among objects outputted on the VR screen as per at least one reference, which may include the position of each object and the pointer object, the importance of the objects, and the attribute of connection between the objects or input method, or may further include various references for determining an object intended to be selected by the user among from the plurality of objects.

The memory 140 includes pointer control information 141 and an application program 142, and may further include information for determining a movement of the electronic device 101 and determining an object to be selected based on the movement of the electronic device 101.

The pointer control information 141 may include information for moving objects outputted in a stereoscopic image into another object. For example, the information may include information about the position of each object and the pointer object, the importance of the objects, and the attribute of connection between the objects or input method, and may further include information for moving any one of the plurality of objects into the position of another object.

The application program 142 may include information related to an application for running on a stereoscopic image screen.

The wearable device 102 may include a device for outputting an HMD mode screen. For example, the electronic device 101 and the wearable device 102 may be configured in their respective devices or both may be configured in a single device.

According to an embodiment of the present disclosure, upon identifying that the electronic device 101 and the wearable device 102 are functionally or electrically coupled together, the display 110 of the electronic device 101 may perform control to output an HMD mode screen.

Figure 2:
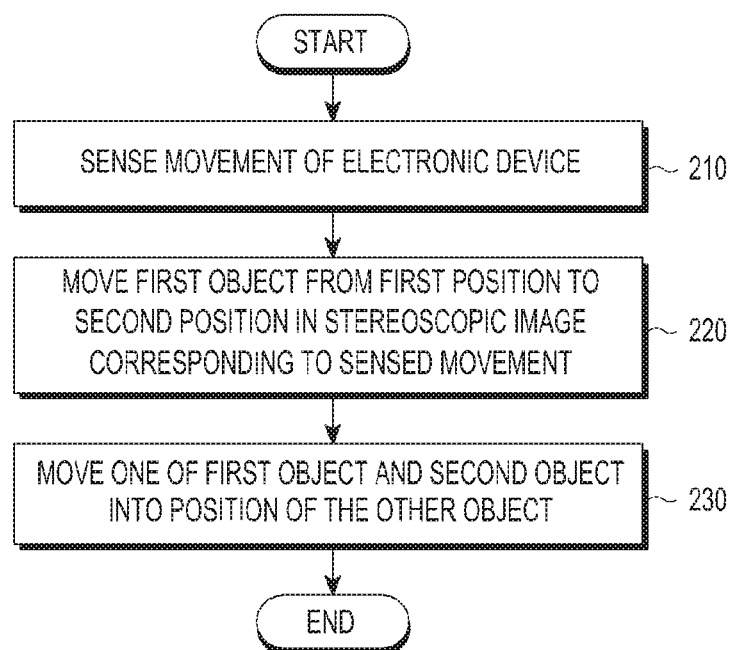
FIG. 2 illustrates a method of controlling an object displayed by an electronic device, according to an embodiment of the present disclosure.

FIG. 2 illustrates a method of controlling an object displayed by an electronic device, according to an embodiment of the present disclosure.

Referring to FIG. 2, the electronic device in step 210 may sense a movement of the electronic device, such as through a device functionally connected with the electronic device or through an acceleration sensor or gyro sensor in the electronic device.

In step 220, the electronic device may move a first object in the stereoscopic image from a first position to a second position corresponding to the sensed movement. For example, the first object may be moved up, down, left, or right in the stereoscopic image, corresponding to an angle of the electronic device with respect to a predetermined position.

In step 230, the electronic device may move one of the first object and second object to the position of the other object. For example, the electronic device may determine whether to move the first object or the second object according to the type of the running application or whether the object is moved.

According to an embodiment of the present disclosure, when the second object is a fixed object on the screen, the first object moving corresponding to the movement of the electronic device may be moved to the position of the second object.

According to an embodiment of the present disclosure, when the second object is a progress bar object moving in continuous actions on the screen, the second object may be moved into the position of the first object corresponding to the movement of the electronic device.

Figure 3:
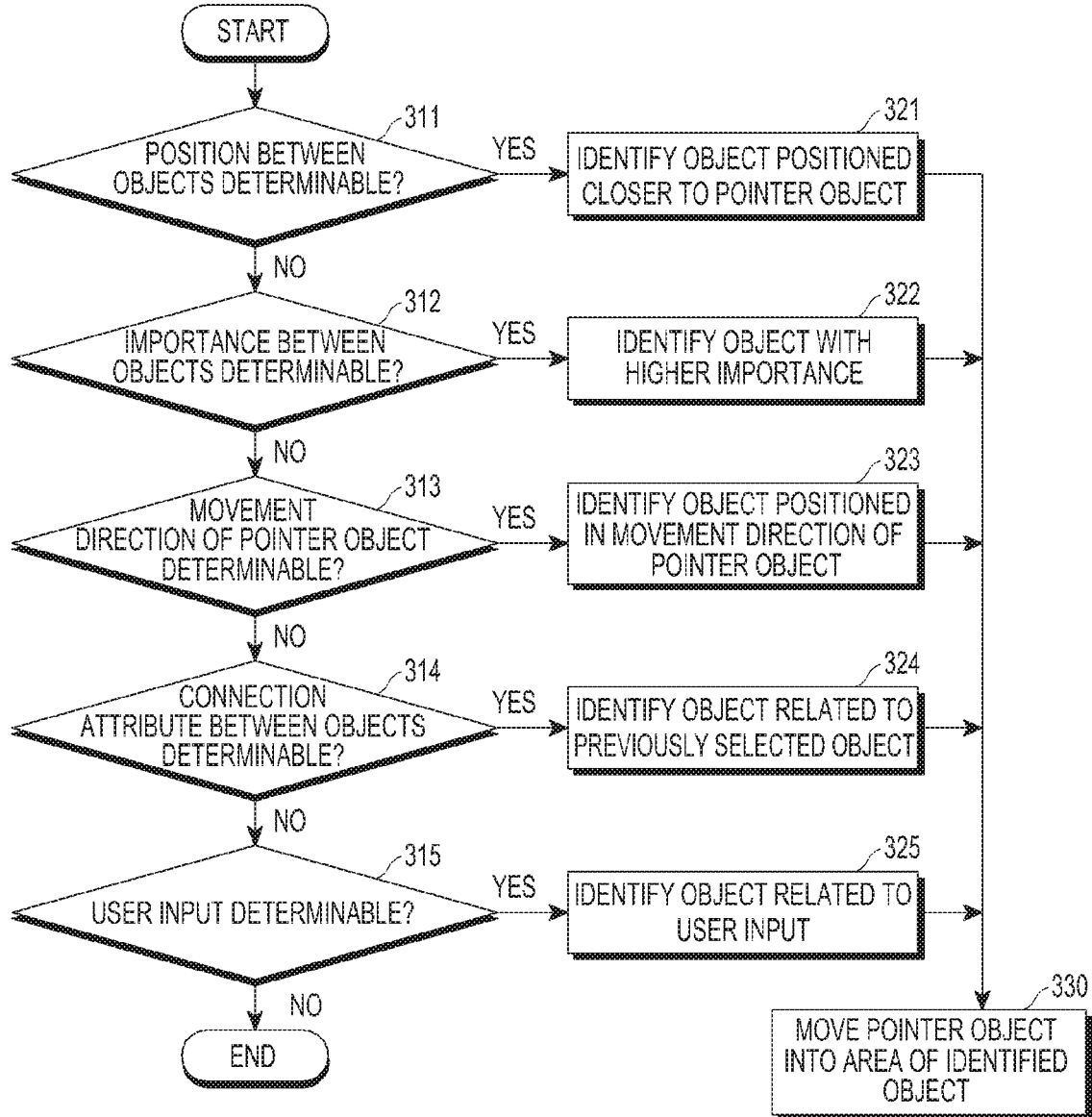
FIG. 3 illustrates a method of determining at least one object among a plurality of objects according to at least one reference by an electronic device, according to an embodiment of the present disclosure.

FIG. 3 illustrates a method of determining at least one object among a plurality of objects according to at least one reference by an electronic device, according to an embodiment of the present disclosure.

Objects and a pointer object between the objects are displayed on a screen outputted from the electronic device, and the pointer object positioned between the objects may be moved into an area of any one of the objects according to at least one reference for the objects, according to embodiments of the present disclosure.

The steps of FIG. 3 described below may be performed in a different order or at least one configuration may be varied or omitted.

Referring to FIG. 3, in step 311, the electronic device may determine whether the position of the pointer object between the objects can be determined.

When the position between the objects is determined to be determinable in step 311, the electronic device in step 321 may identify an object positioned closest to the pointer object among the objects.

When the position between the objects is determined not to be determinable in step 311, the electronic device in step 312 may determine whether an importance between the objects is determinable, such as based on one of the count of running a corresponding object and relevance with the user.

When the importance between the objects is determined to be determinable in step 312, the electronic device in step 322 may identify the higher in importance of the objects.

When the importance between the objects is determined not to be determinable in step 312, the electronic device 313 may determine whether a movement direction of the pointer object is determinable.

When the movement direction of the pointer object is determined to be determinable in step 313, the electronic device in step 323 may identify an object positioned in the direction along which the pointer object moves among the objects.

When the movement direction of the pointer object is determined not to be determinable in step 313, the electronic device in step 314 may determine whether a connection attribute between the objects is determinable. For example, the connection attribute between the objects may be related information about an object selected earlier than the objects and each of the objects and may be considered to identify an object related to the pointer object among the objects.

When the connection attribute between the objects is determined to be determinable in step 314, the electronic device in step 324 may identify an object related to the previously selected object among the objects.

When the connection attribute between the objects is determined not to be determinable in step 314, the electronic device in step 315 may determine whether a user input, other than the user movement for controlling the pointer object is entered. For example, the user input may include the user's voice data, gesture input such as touch, biological information or other inputs related to the user that are entered through the electronic device.

When entry of the other user input is determined to be determinable in step 315, the electronic device in step 325 may identify an object related to the entered user input among the objects.

As at least one of the above-described operations 321, 322, 323, 324, and 325 is performed, the electronic device in step 330 may move the pointer object into an area of the object identified through the above-described operations.

Figure 4A:
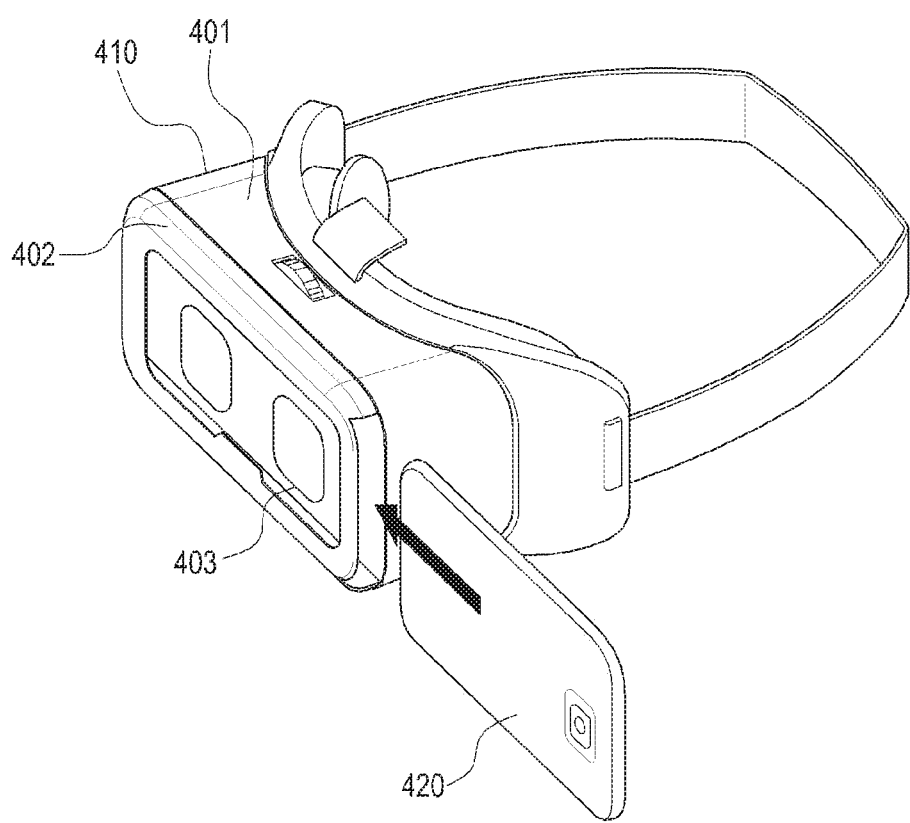
FIGS. 4A and 4B illustrate an example of a wearable device, according to an embodiment of the present disclosure.
Figure 4B:
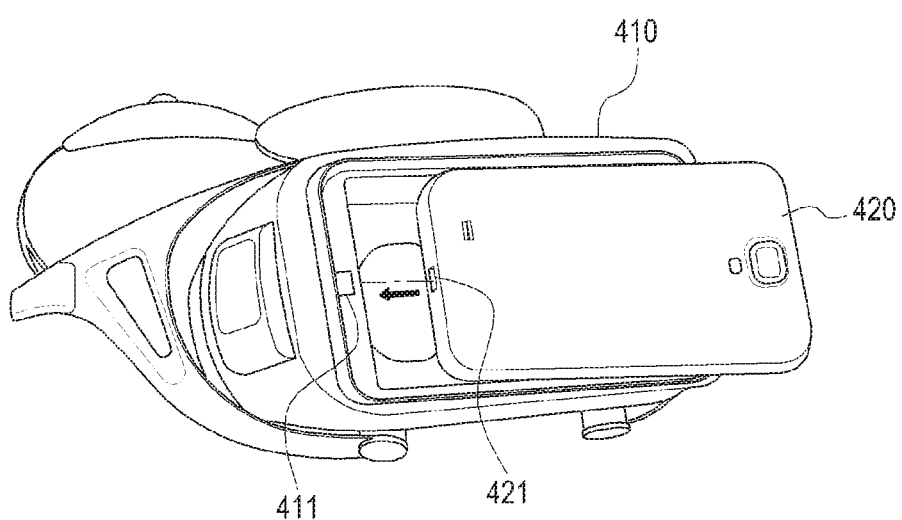

FIGS. 4A and 4B illustrate an example of a wearable device, according to an embodiment of the present disclosure.

Referring to FIGS. 4A and 4B, the wearable device 410 may be the electronic device 102 of FIG. 1, for example. The wearable device 410 may provide only functions of a mount or support with no communication functionality with the electronic device 420. The wearable device 410 may include a body 401 and a cover 402.

When the electronic device 420 is mounted on the wearable device 410, the cover 402 may cover the edge of a rear surface of the electronic device 420 to be fastened to the wearable device 410 so that the electronic device 420 may remain in a mounted position. The wearable device 410 may have a support available for the user to wear the wearable device 410 on his/her head.

The wearable device 410 may have lenses respectively corresponding to an eye of the user (wearer). The user may view the display of the electronic device 420 through the lenses with the electronic device 420 mounted on the wearable device 410. The wearable device 410 may have a mechanical or instrumental structure allowing the electronic device 420 to be mounted on the wearable device 410 as shown.

According to an embodiment of the present disclosure, the wearable device 410 may include at least one of the components of the electronic device 101 shown in FIG. 1, such as a touch panel, a button, a wheel key, and a touch pad. The touch panel may receive the user's touch input, such as the user's touch on the touch panel or a hovering input near the touch panel. When the electronic device 420 is mounted, the wearable device 410 may connect with the electronic device 420 via an interface such as USB, to communicate with the electronic device 420.

The electronic device 420 may control a function corresponding to an input received from the wearable device 410 in response to the input, such as adjusting the sound volume or controlling the screen (e.g., an image playing screen of the HMD mode) in response to the received input. For example, when the electronic device 420 is mounted on the wearable device 410, an external device connecting unit of the electronic device 420 may be electrically connected with the connecting unit of the wearable device 410 to enable communication between the devices.

Figure 5:
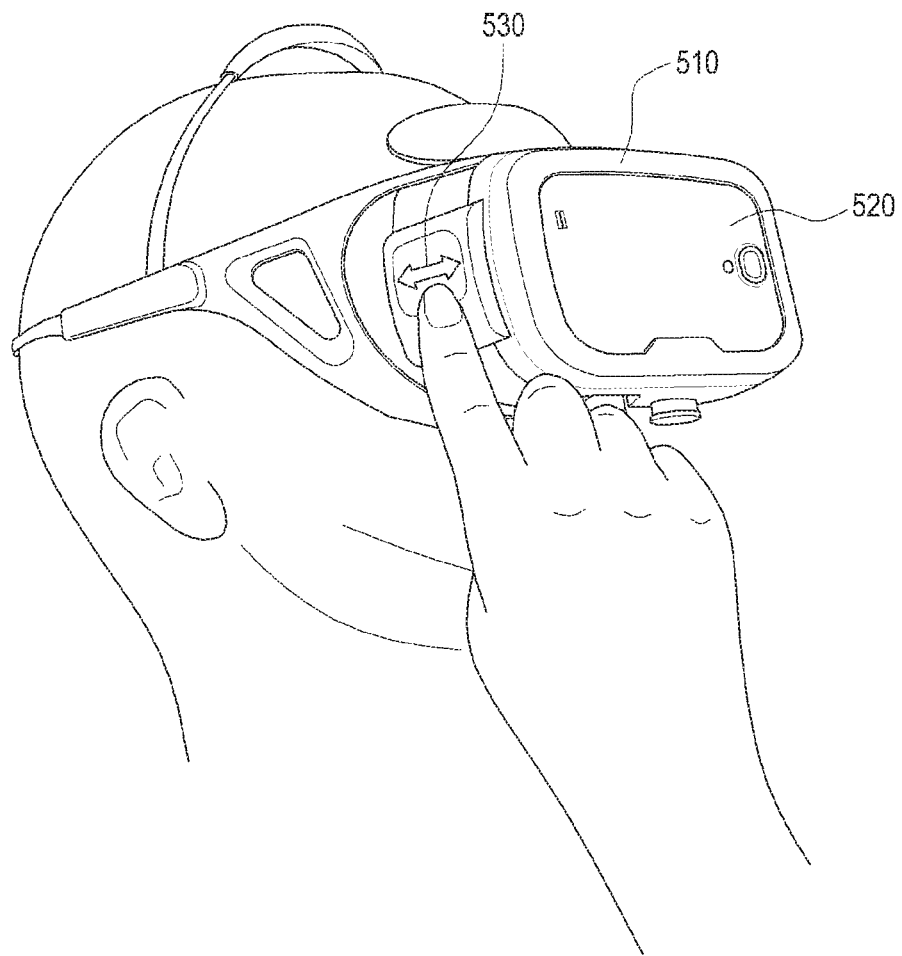
FIG. 5 illustrates an example in which a user wears an electronic device-mounted wearable device, according to an embodiment of the present disclosure.

FIG. 5 illustrates an example in which a user wears an electronic device-mounted wearable device, according to an embodiment of the present disclosure.

In FIG. 5, the user may control the functions of the electronic device 520 or of the wearable device 510 through the touch pad 530 provided in a side surface of the wearable device 510.

Referring to FIGS. 4A, 4B, and 5, the electronic devices 420 and 520 may be the electronic device 101 of FIG. 1, such as smartphones with a display means. The wearable devices 410 and 510 may be the electronic device 101 or wearable device 102 of FIG. 1 or may be instrumental, wearable mounts.

As shown in FIGS. 4A, 4B, and 5, the electronic devices 420 and 520 may be mounted on the wearable devices 410 and 510 so that the display, i.e., the touchscreen 530 faces the user's face. The user may fasten the electronic devices 420 and 520 to the wearable devices 410 and 510 by getting closer to the covers of the wearable devices 410 and 510. In FIG. 5, the user may wear the electronic device 520-mounted wearable device 510 on his/her head, and may view the screen of the display of the electronic device 520 through the lenses of the wearable device 510.

Figure 6:
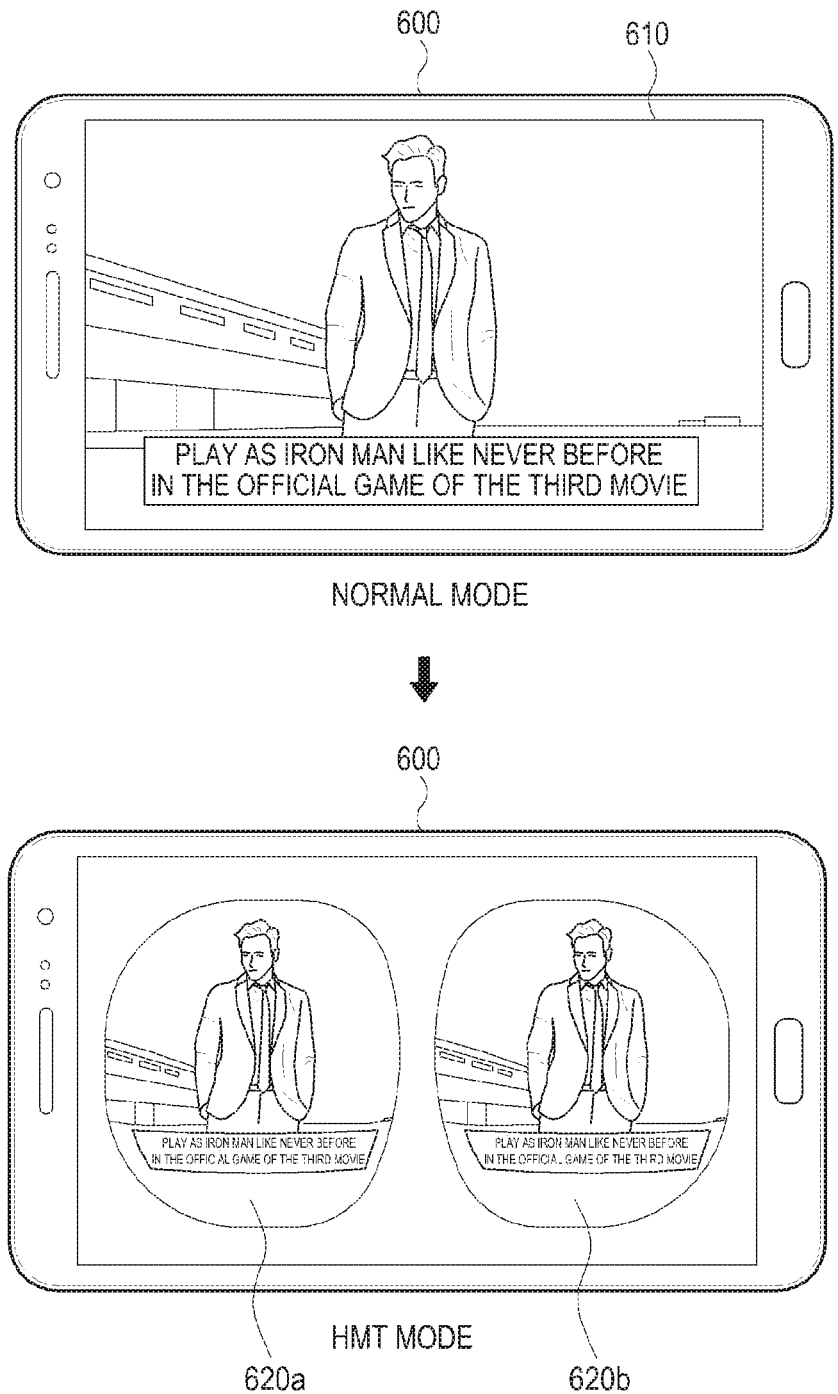
FIG. 6 illustrates a screen mode of an electronic device, according to an embodiment of the present disclosure.

FIG. 6 illustrates a screen mode of an electronic device, according to an embodiment of the present disclosure.

Referring to FIG. 6, the electronic device 600 may be the electronic device 420 or 520 as shown in FIGS. 4A, 4B, and 5. When operating in the normal mode, the electronic device 600 may display one operation screen 610 as shown in the upper screen of FIG. 6.

According to an embodiment of the present disclosure, when mounted on a wearable device, the electronic device 600 may be operated in the HMD mode as shown in the lower screen of FIG. 6. When the electronic device 600 is operated in the HMD mode, a screen 620a corresponding to the user's left eye and another screen 620b corresponding to the user's right eye may be distinctively displayed. In the screen of the HMD mode, one image may be separately displayed as two images 620a and 620b.

According to an embodiment of the present disclosure, when the electronic device 600 is mounted on the wearable device and operated in the HMD mode, the display area or display position of the screen corresponding to the HMD mode (the screen 620*a* corresponding to the left eye and the screen 620*b* corresponding to the right eye) may be determined.

Figure 7:
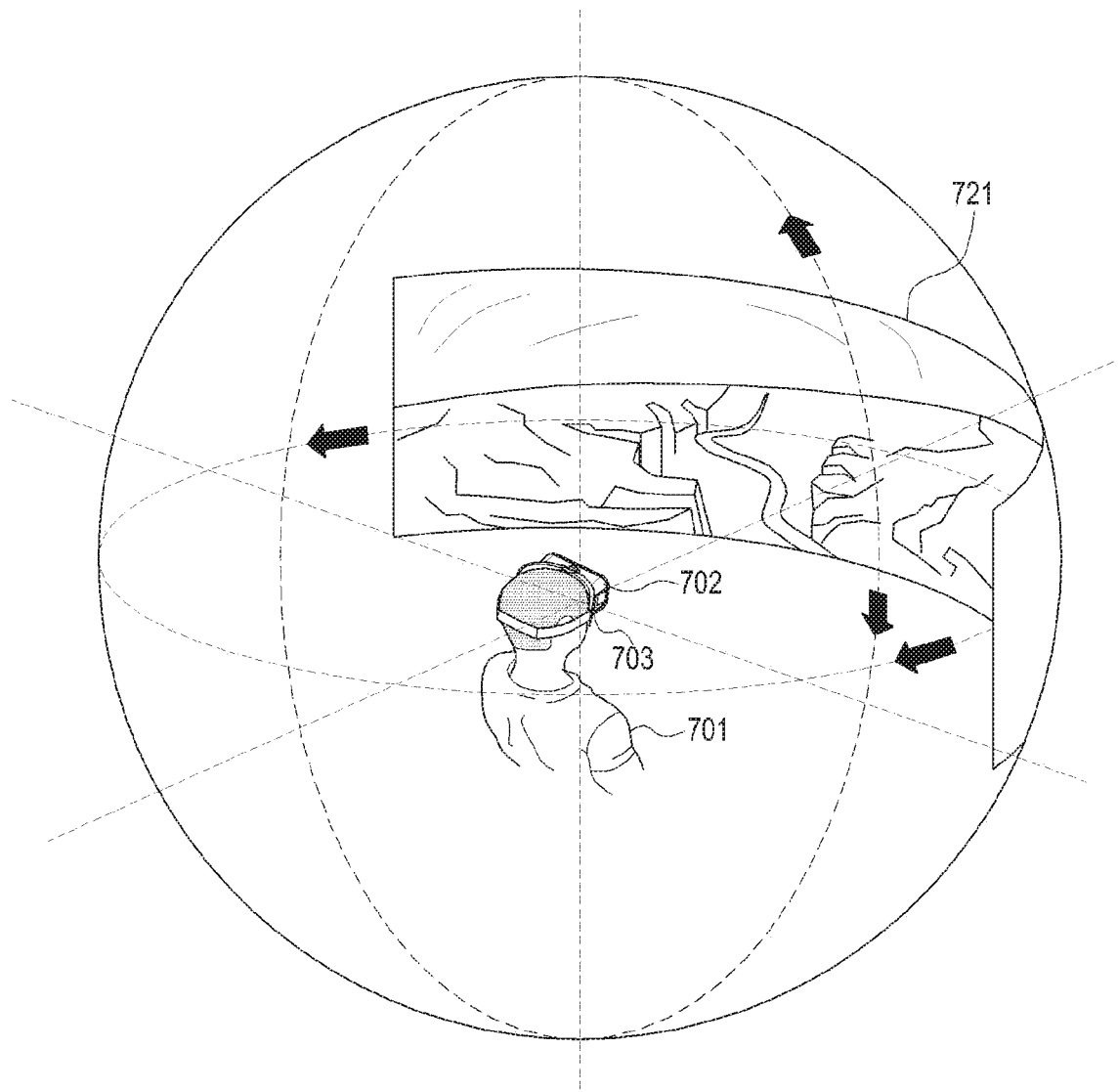
FIG. 7 illustrates an example of a display screen of an electronic device when the electronic device is mounted on a wearable device, according to an embodiment of the present disclosure.

FIG. 7 illustrates an example of a display screen of an electronic device when the electronic device is mounted on a wearable device, according to an embodiment of the present disclosure.

Referring to FIG. 7, the user 701 may wear an electronic device 702-mounted wearable device 703. For example, an HMD mode screen 721 may be outputted on the display of the electronic device 702.

According to an embodiment of the present disclosure, the HMD mode screen 721 is configured in a three-dimension (3D) stereoscopic image, and objects corresponding to points of a movement of the electronic device 702 among objects of the HMD mode screen 721 may be outputted through the electronic device 702. For example, when the user 701 lifts his/her face up, the electronic device 702 may move upwards accordingly, and a screen and objects positioned over a reference position of the HMD mode screen 721 may be outputted through the electronic device 702.

According to an embodiment of the present disclosure, when a pointer object is outputted on the HMD mode screen 721, the electronic device 702 may control the pointer object according to the movement of the electronic device 702.

FIGS. 8A to 8D illustrate screens displayed through an electronic device, according to an embodiment of the present disclosure.

Figure 8A:
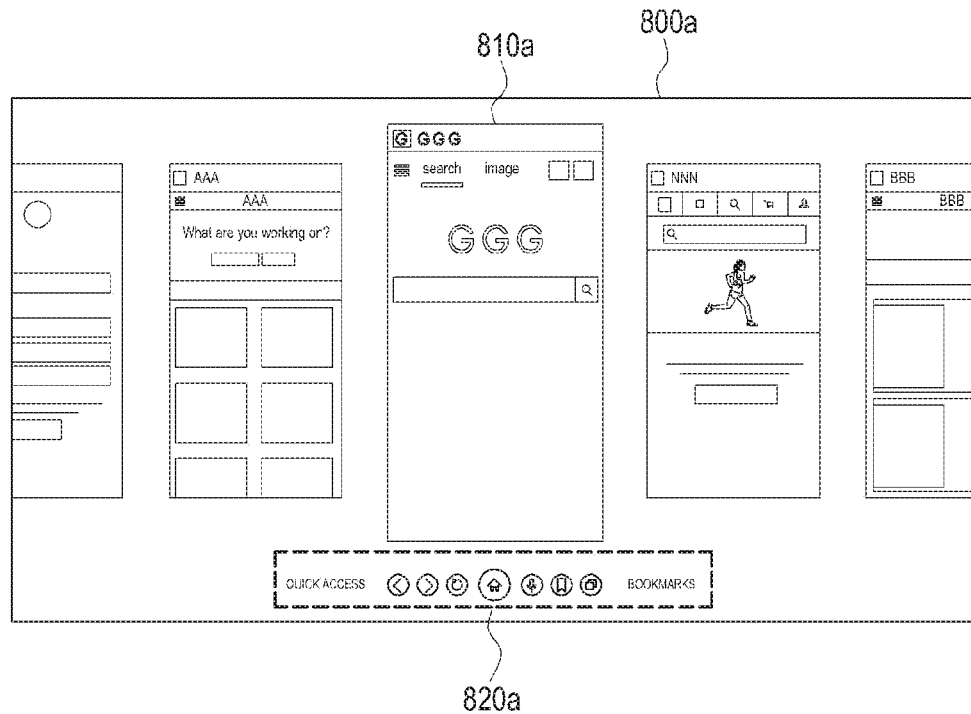
FIGS. 8A to 8D illustrate screens displayed through an electronic device, according to an embodiment of the present disclosure.

Referring to FIG. 8A, the electronic device may output a screen 800*a* including thumbnail images 810*a* for at least one webpage or control objects 820*a* for accessing a particular webpage. For example, when one of the thumbnail images is selected through the screen 800*a*, the electronic device may access the website corresponding to the selected thumbnail image 810*a*.

According to an embodiment of the present disclosure, when one of the control objects 820*a* is selected, the electronic device may perform an operation such as move back or go to home screen, for controlling the previously selected object (e.g., the thumbnail image 810*a*).

Figure 8B:
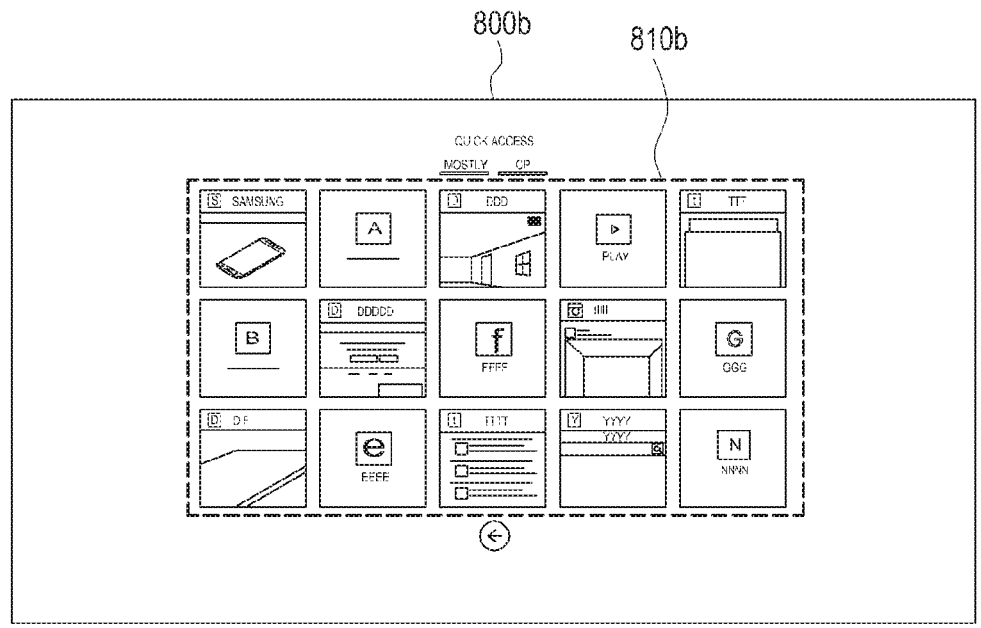

Referring to FIG. 8B, the electronic device may output an execution screen 800*b* of a program (e.g., "quick access") for running at least one application. For example, the at least one application may be run on the electronic device for a preset time or may be designated according to the count of execution.

According to an embodiment of the present disclosure, the execution screen may include thumbnail images 810*b* for the at least one application. For example, when one of the thumbnail images 810*b* is selected, the electronic device may run an application corresponding to the selected thumbnail image, or may run a website corresponding to the selected thumbnail image or a new website.

Figure 8C:
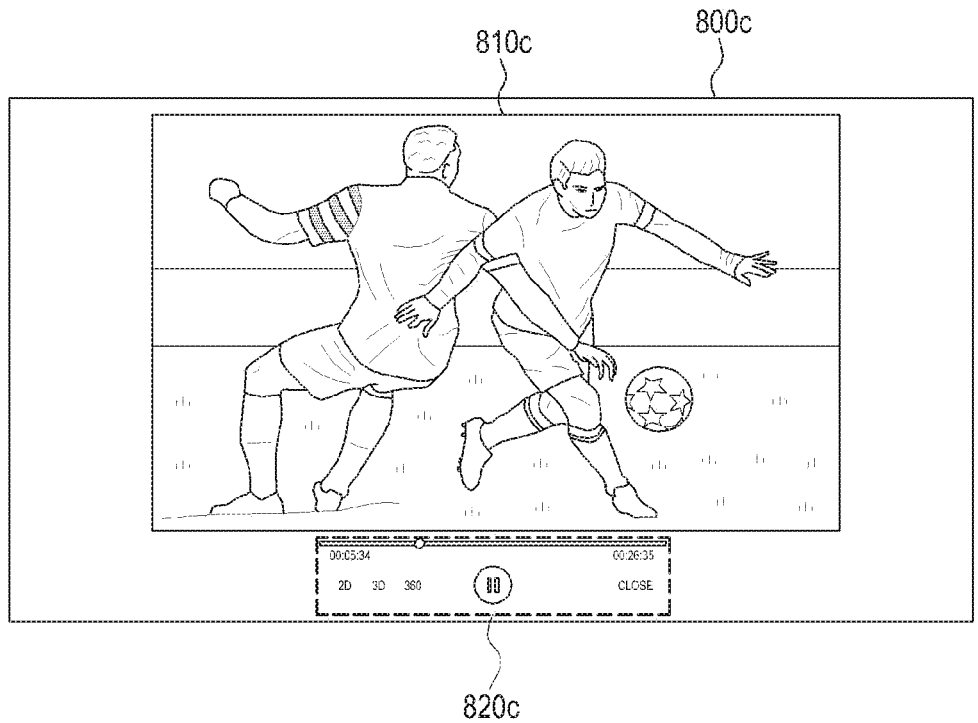

Referring to FIG. 8C, the electronic device may output an execution screen 800*c* of a media playing application, which may include an area 810*c* where a playing media file is outputted and an area 820*c* for controlling the playing of the media file.

Figure 8D:
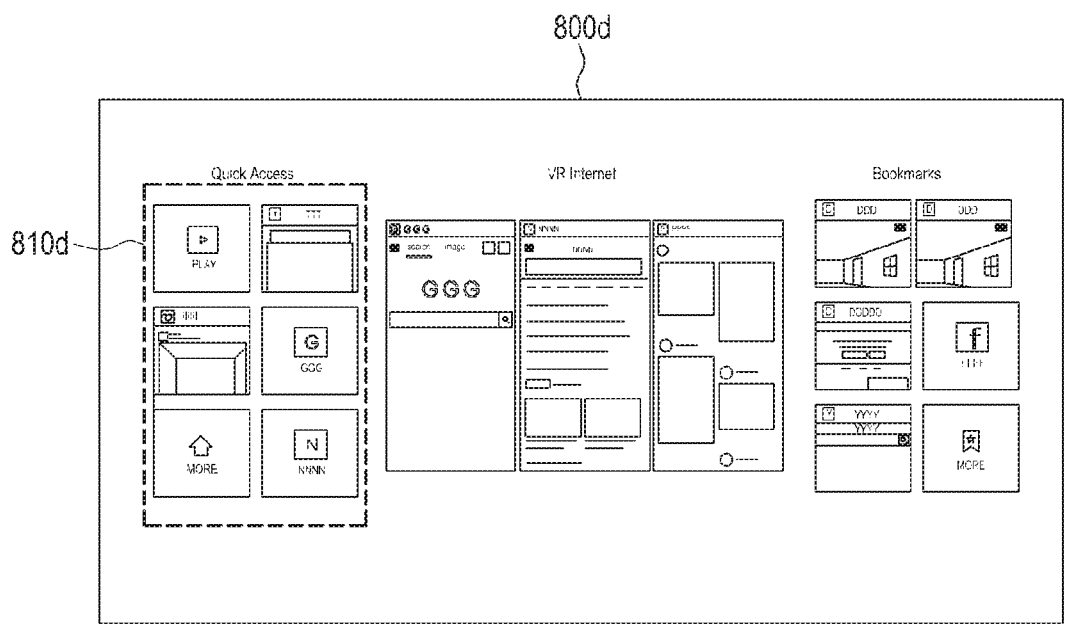

Referring to FIG. 8D, the screen 800*d* displayed through the electronic device may include a thumbnail image 810*d* of at least one program and an object related to a particular program. For example, the at least one program may include a program (e.g., "quick access") for running at least one application, a web browser (e.g., VR Internet), or bookmarks and may further include a thumbnail image of a program designated according to the count of running on the electronic device for a preset time.

According to an embodiment of the present disclosure, when a user input is entered or pointer object is overlapped for an area (e.g., the thumbnail image 810*d*) of any one program, the electronic device may run a program related to the selected thumbnail image 810*d*.

Figure 9:
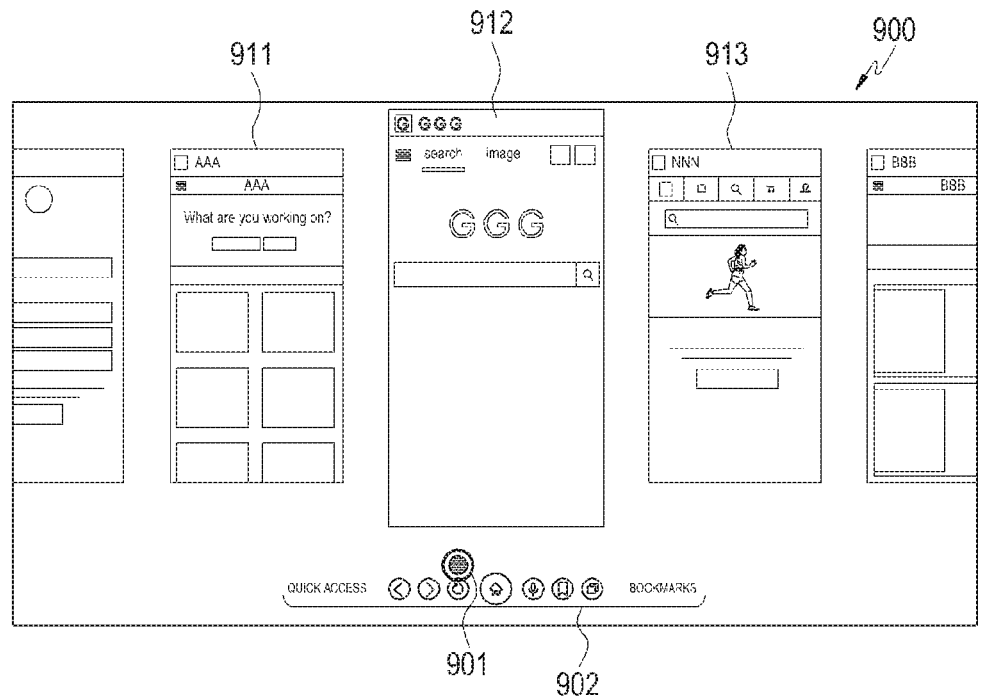
FIG. 9 illustrates a screen displayed through an electronic device, according to an embodiment of the present disclosure.

FIG. 9 illustrates a screen displayed through an electronic device, according to an embodiment of the present disclosure.

Referring to FIG. 9, the electronic device may output an HMD mode screen 900 which may include an object such as a first webpage 911, second webpage 912, and third webpage 913 of an execution screen of at least one application and a button object 902 and pointer object 901 performing a pre-designated operation.

According to an embodiment of the present disclosure, the pointer object 901 may be moved as the electronic device moves, and when the moving pointer object 901 overlaps one of the outputted objects, a control may be performed such that the object overlapping the pointer object 901 is highlighted. For example, a control may be performed such that other indications that the pointer object 901 is overlapped, such as by enlarging or brightening, may be outputted through the particular object on the HMD mode screen 900.

According to an embodiment of the present disclosure, when the pointer object 901 is positioned between the second webpage 912 and the button object 902, the electronic device may move the pointer object 901 into the position of one of the second webpage 912 and the button object 902. For example, the electronic device may move the pointer object 901 into the position of one of the objects based on the distance between the pointer object 901 and each of the second webpage 912 and button object 902 and the movement direction of the pointer object 901.

Figure 10:
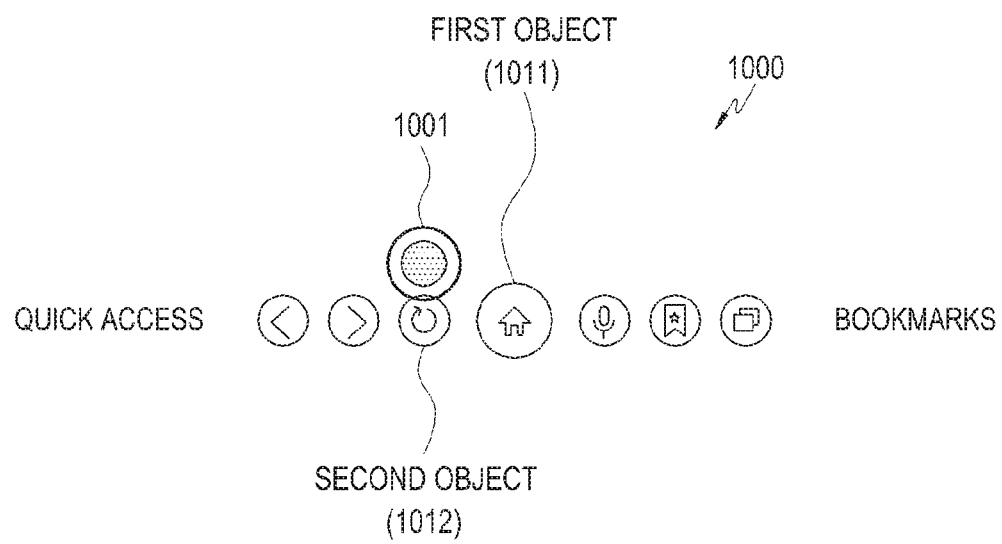
FIG. 10 illustrates a screen displayed in an HMD mode, according to an embodiment of the present disclosure.

FIG. 10 illustrates a screen displayed in an HMD mode, according to an embodiment of the present disclosure.

Referring to FIG. 10, the HMD mode screen 1000 may include at least one object, such as a first object 1011 and second object 1012 for performing a pre-designated operation and a pointer object 1001 for indicating the at least one object.

According to an embodiment of the present disclosure, the movement of the pointer object 1001 may be controlled according to the movement of the user wearing the electronic device outputting the HMD mode screen 1000.

According to an embodiment of the present disclosure, when the pointer object 1001 is moved into an area between the first object 1011 and the second object 1012, the electronic device may move the pointer object 1001 to overlap one of the first object 1011 or the second object 1012 according to at least one reference. For example, when the distance between the pointer object 1001 and the first object 1011 is greater than the distance between the pointer object 1001 and the second object 1012, the electronic device may move the pointer object 1001 into the position of the second object 1012.

Figure 11:
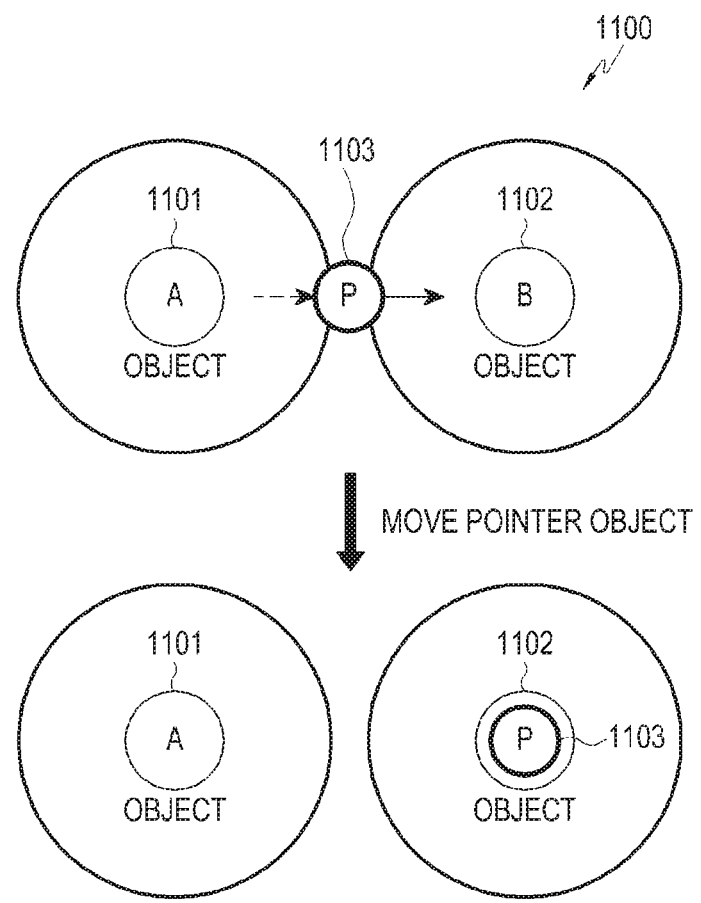
FIG. 11 illustrates when an object is moved, according to an embodiment of the present disclosure.

FIG. 11 illustrates when an object is moved, according to an embodiment of the present disclosure.

Referring to FIG. 11, the HMD mode screen 1100 may include at least one object, such as a first object (e.g., 'A') 1101 and second object (e.g., 'B') 1102 for performing a pre-designated operation and a pointer object (e.g., 'P') 1103 for indicating the at least one object.

According to an embodiment of the present disclosure, the movement of the pointer object 1103 may be controlled according to the movement of the user wearing the electronic device outputting the HMD mode screen 1100.

When the pointer object 1103 is positioned between the first object 1101 and the second object 1102 for a preset time such as 3 seconds, the electronic device may move the pointer object 1103 to overlap one of the first object 1101 or the second object 1102 according to the movement direction of the pointer object 1103. For example, when the pointer object 1103 moves in a direction from the first object 1101 to the second object 1102, the electronic device may move the pointer object 1103 into an area where the second object is displayed such that the pointer object 1103 is displayed overlapping the second object 1102.

Figure 12:
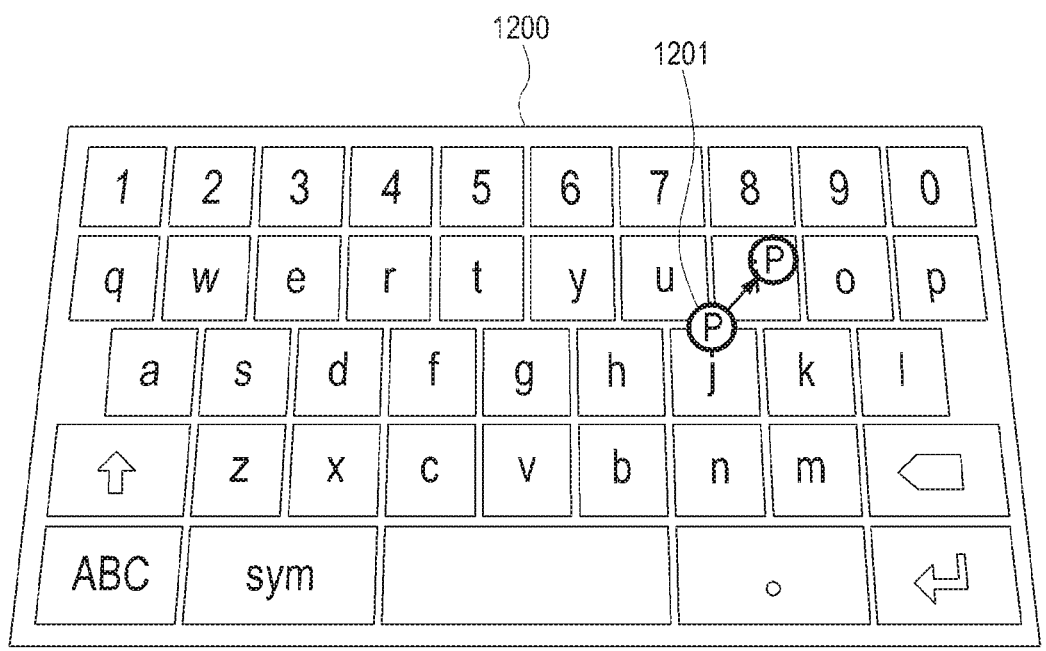
FIG. 12 illustrates when an object is moved, according to an embodiment of the present disclosure.

FIG. 12 illustrates when an object is moved, according to an embodiment of the present disclosure.

Referring to FIG. 12, the HMD mode screen may include a keypad object 1200 for entering a pre-designated character or a pointer object 1201 for indicating the at least one object. The keypad object 1200 may include an object (e.g., a "j" button or "i" button) related to at least one character (e.g., an alphabet character, number, symbol, consonant, or vowel).

According to an embodiment of the present disclosure, the movement of the pointer object 1201 may be controlled according to the movement of the user wearing the electronic device outputting the HMD mode screen.

According to an embodiment of the present disclosure, when the pointer object 1201 is positioned between the "j" button and the "i" button for the preset time, the electronic device may identify an object where the pointer object 1201 was previously positioned and move the pointer object 1201 to overlap the object where the pointer object 1201 was previously positioned. For example, when the pointer object 1201 was positioned on the "s" button corresponding to a consonant, the electronic device may move the pointer object 1201 into the area where the "i" button is displayed to overlap the "i" button corresponding to a vowel.

According to an embodiment of the present disclosure, the keypad object 1200 may be set to receive an input of a Korean character. When a character showing the end of a sentence, such as " 다 " or " 가 " is entered, the electronic device may move the pointer object 1201 into an object corresponding to a period among objects positioned adjacent to the pointer object 1201.

Figure 13:
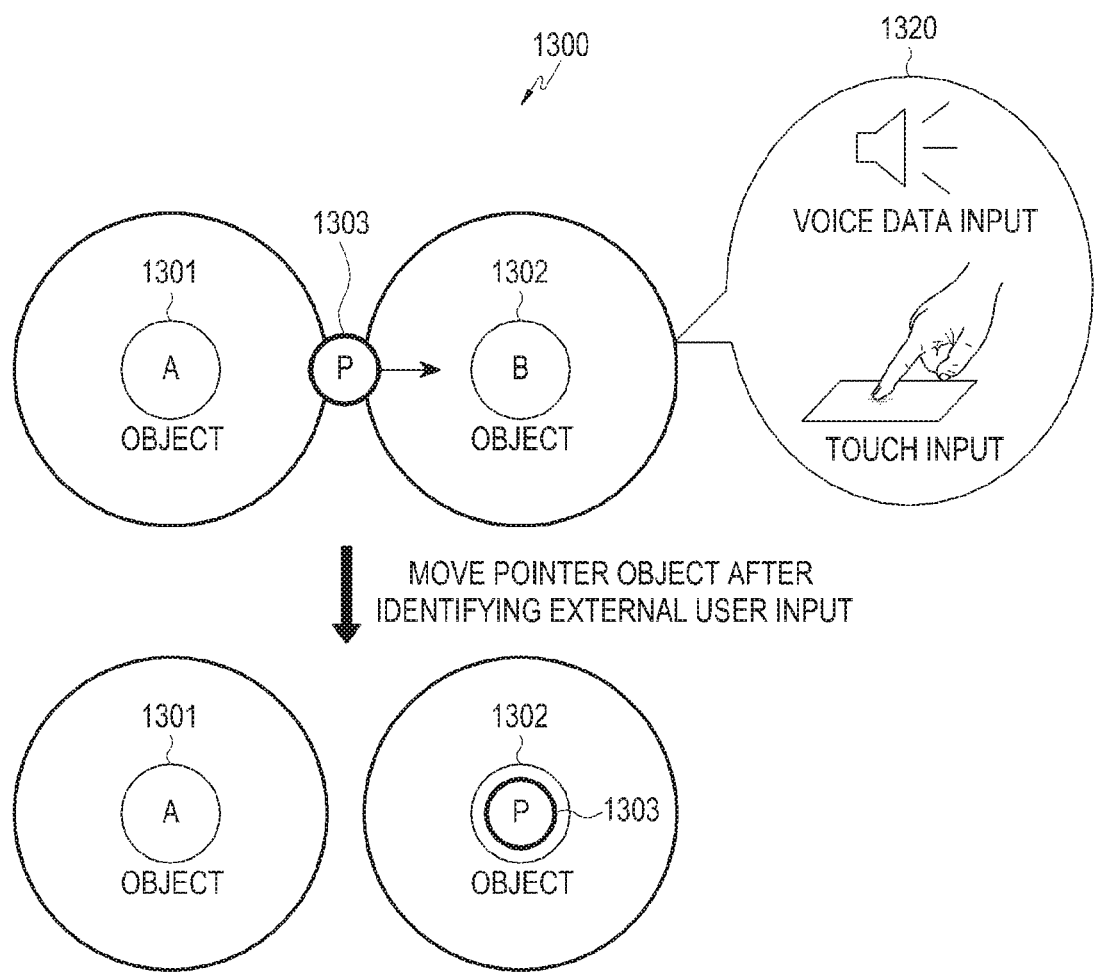
FIG. 13 illustrates when an object is moved, according to an embodiment of the present disclosure.

FIG. 13 illustrates when an object is moved, according to an embodiment of the present disclosure.

Referring to FIG. 13, the HMD mode screen 1300 may include at least one of a first object (e.g., 'A') 1301 and second object (e.g., 'B') 1302 for performing a pre-designated operation and a pointer object (e.g., 'P') 1303 for indicating the at least one object.

According to an embodiment of the present disclosure, the movement of the pointer object 1303 may be controlled according to the movement of the user wearing the electronic device outputting the HMD mode screen 1300.

According to an embodiment of the present disclosure, when the pointer object 1303 is positioned between the first object 1301 and the second object 1302 for the preset time, the electronic device may move the pointer object 1303 to overlap one of the first object 1301 and the second object 1302 further considering a user input, such as voice data or touch input, other than the user's movement.

For example, the electronic device may move the pointer object 1303 into the area where the second object is displayed further considering the user's voice data so that the pointer object 1303 is displayed overlapping the first object 1301 related to information (e.g., a command for running a gallery application, entry of the name ("B") of the second object 1302 or "right-hand") contained in the voice data.

For example, when a touch input sensed through the electronic device or wearable device is identified to be a pre-designated input (e.g., a swipe input to the left), the electronic device may move the pointer object 1303 into the object corresponding to the designated input.

Figure 14:
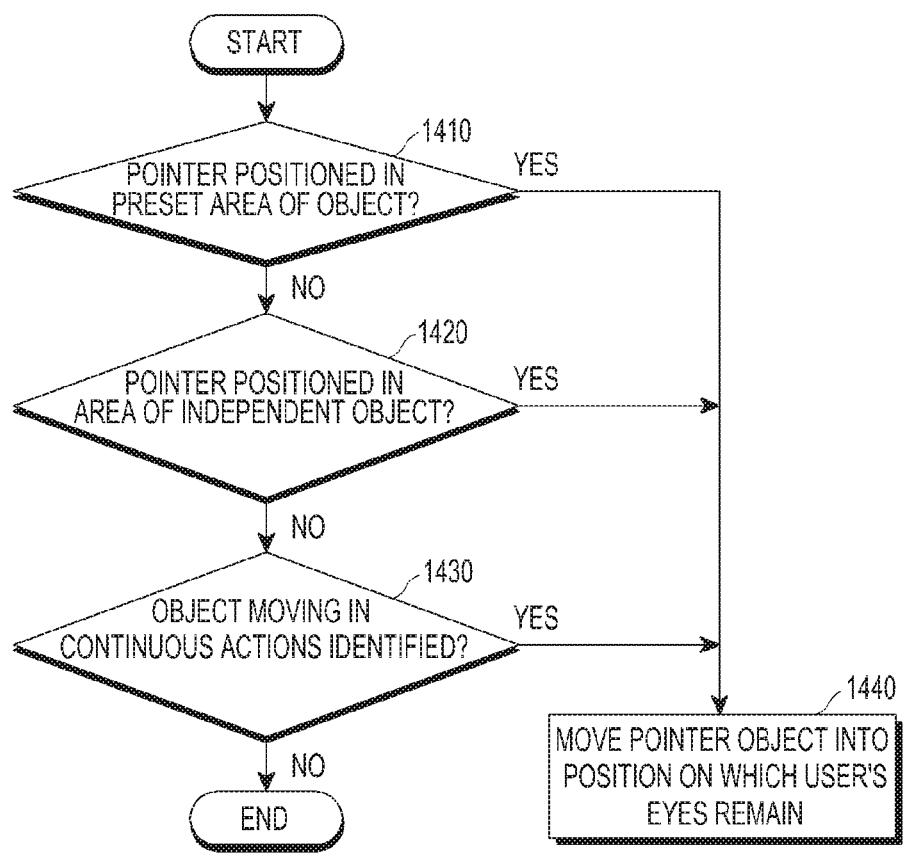
FIG. 14 illustrates a method of moving an object displayed through an electronic device, according to an embodiment of the present disclosure.

FIG. 14 illustrates a method of moving an object displayed through an electronic device, according to an embodiment of the present disclosure.

Referring to FIG. 14, in step 1410, the electronic device may determine whether a pointer object is positioned within a preset area for a particular object. For example, the preset area may include at least a portion of the particular object.

When the pointer object is determined not to be positioned within the preset area in step 1410, the electronic device in step 1420 may determine whether the pointer object is positioned in an area of an independent object, such as at least a portion of an area other than the area of the particular object in the entire display area.

When the pointer object is determined not to be positioned in the area of the independent object in step 1420, the electronic device in step 1430 may determine whether an object moving in continuous actions is identified. For example, the object moving in continuous actions may include an indicator on a progress bar.

When the pointer object is determined to be positioned in the preset area or independent area or an object moving in continuous actions in step 1410, 1420, or 1430, the electronic device in step 1440 may move the pointer object into the position on which the user's eyes focus. For example, the position on which the user's eyes focus may correspond to where the user's eyes remain and an angle at which the electronic device moves up, down, left, or right with respect to a predesignated reference position.

Figure 15:
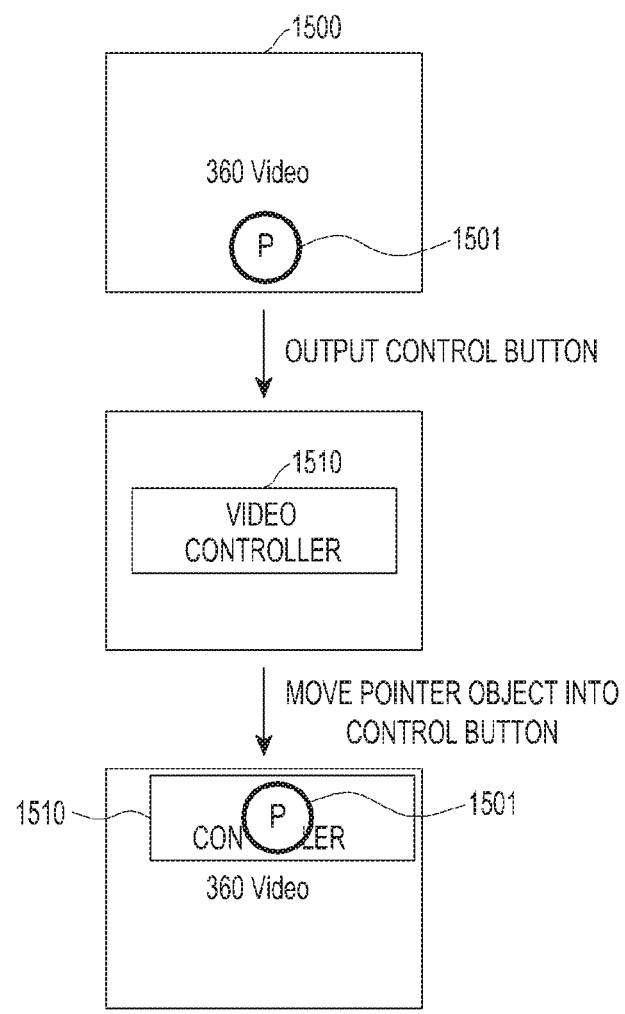
FIG. 15 illustrates when a displayed object is moved, according to an embodiment of the present disclosure.

FIG. 15 illustrates when a displayed object is moved, according to an embodiment of the present disclosure.

Referring to FIG. 15, the electronic device may output an execution screen 1500 of a media playing application, which may include an area where the media file plays and a video controller button 1510 for controlling the playing of the media file. For example, the video controller button 1510 may be outputted as the pointer object 1501 has a fixed position in a preset area of the screen 1500 for a predetermined time.

According to an embodiment of the present disclosure, when the video controller button 1510 is outputted, the electronic device may move the pointer object 1501 into the position of the video controller button 1510.

According to an embodiment of the present disclosure, the electronic device may control the movement of displayed objects to perform various operations related to an object with minimized user movement.

Figure 16:
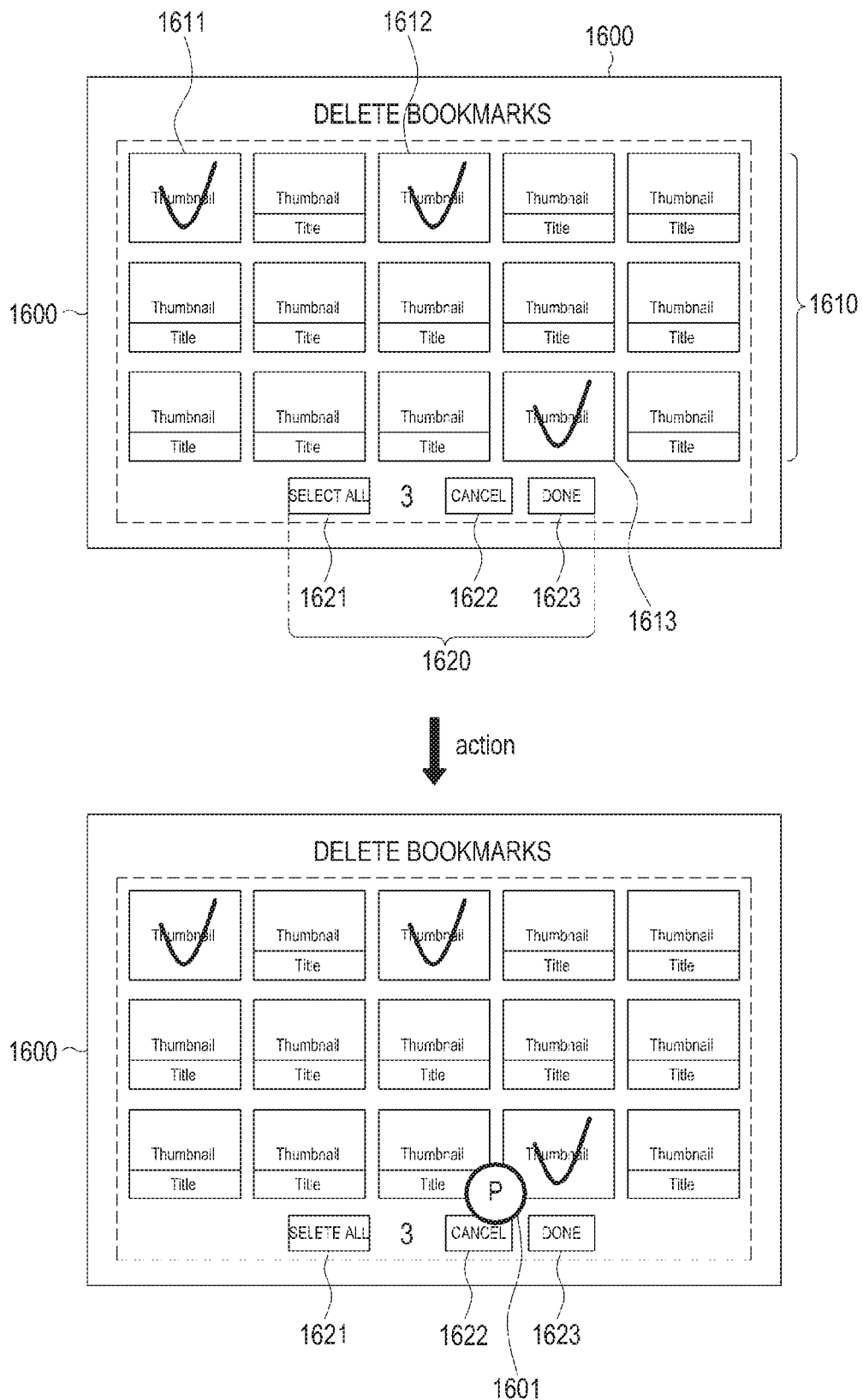
FIG. 16 illustrates when a displayed object is moved, according to an embodiment of the present disclosure.

FIG. 16 illustrates when a displayed object is moved, according to an embodiment of the present disclosure.

Referring to FIG. 16, the electronic device may output an execution screen 1600 of an application managing a list of objects set as bookmarks by the user in the HMD mode. For example, the execution screen 1600 may include thumbnail images 1610 respectively corresponding to the bookmarks and a control button area 1620 for controlling the thumbnail images. The control button area 1620 may include a "SELECT ALL" button 1621 for selecting all the thumbnail images, a "CANCEL" button 1622 for canceling the selection of a thumbnail image, and a "DONE" button 1623 for ensuring that a thumbnail image is selected.

According to an embodiment of the present disclosure, when a preset operation is run through the execution screen, the electronic device may move the pointer object 1601 into the control button area 1620. For example, when at least one object (e.g., 1611, 1612, or 1613) is selected from the bookmarks, and the electronic device moves at an angle allowing the electronic device to face in a lower direction, the electronic device may move the pointer object 1601 into the position of the CANCEL button 1622 or DONE button 1623.

According to an embodiment of the present disclosure, the electronic device may move the pointer object 1601 into the area of one of the CANCEL button 1622 or DONE button 1623 or an area between the CANCEL button 1622 and the DONE button 1623, considering at least one reference position of each of the buttons on the execution screen 1600.

According to an embodiment of the present disclosure, upon failing to sense the user's movement for a predetermined time through the execution screen, the electronic device may move the pointer object 1601 into the position of the SELECT ALL button 1621.

Figure 17:
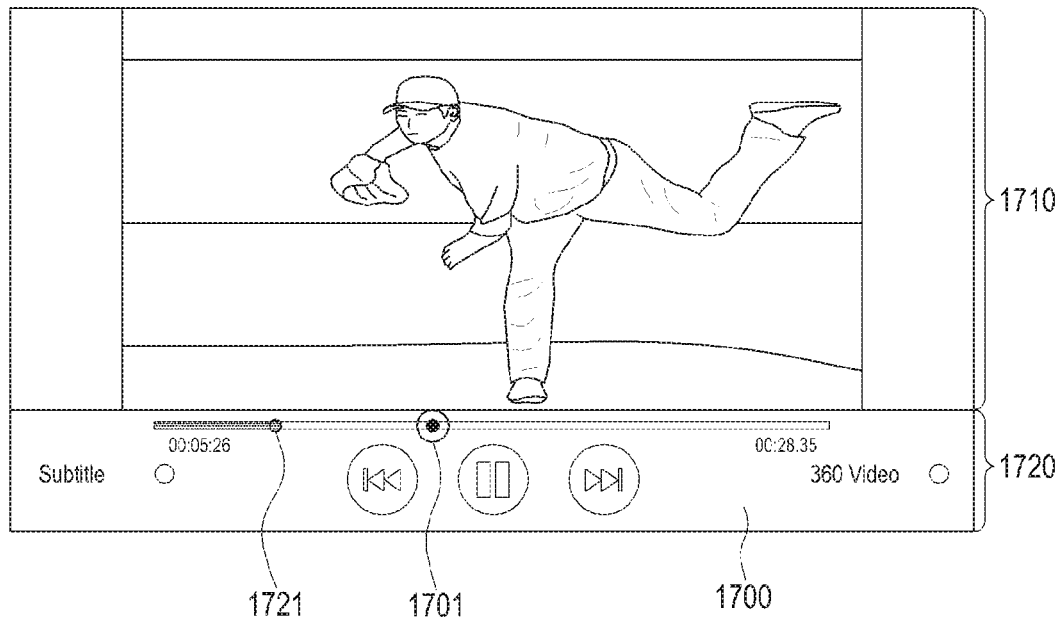
FIG. 17 illustrates an example of an application execution screen where a displayed object is moved, according to an embodiment of the present disclosure.
Figure 17:
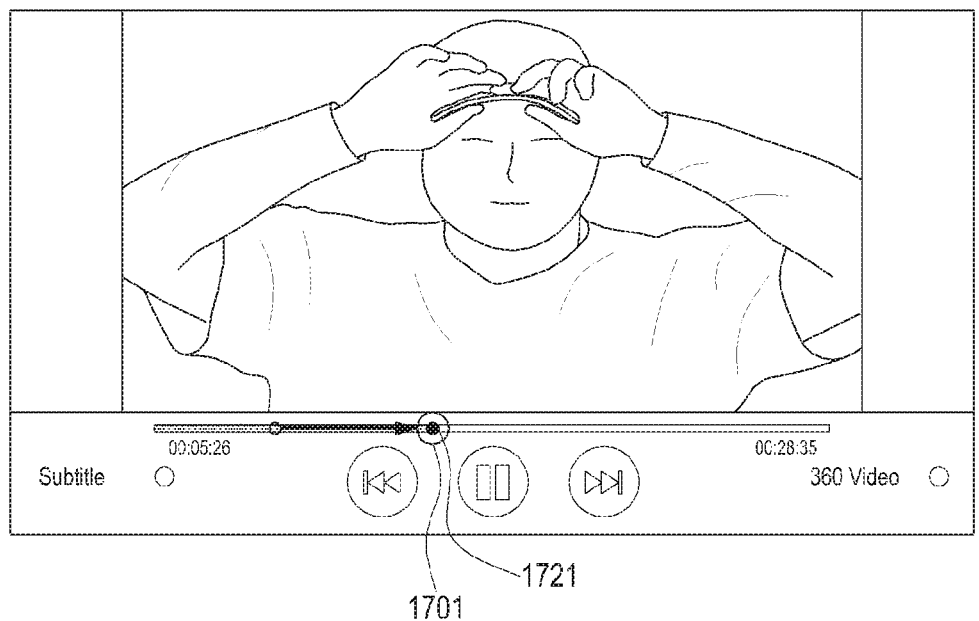

FIG. 17 illustrates an example of an application execution screen where a displayed object is moved, according to an embodiment of the present disclosure.

Referring to FIG. 17, the electronic device 1700 may output an execution screen of a media playing application, such as a video file. The execution screen may include an area 1710 where the video file plays and a control button area 1720 for controlling the playing of the video file.

According to an embodiment of the present disclosure, the control button area 1720 may include a progress bar area 1720 having a first object 1721 indicating a time played and a pointer object 1701 moving as the electronic device moves.

According to an embodiment of the present disclosure, the first object 1721 of the progress bar area 1720 may be moved in a predetermined action as the media file plays and may move into the position of the pointer object 1701 as the electronic device moves.

The user may fasten the pointer object 1701 to an area corresponding to a first time for a predetermined time. For example, the electronic device may identify the time when the movement of the pointer object 1701 is fastened and move the first object 1721 into the area corresponding to the identified first time.

When a predetermined time passes after the first object 1721 has moved into the area corresponding to the first time, the video file may be played from the section corresponding to the first time through the area 1710 where the video file plays.

Figure 18:
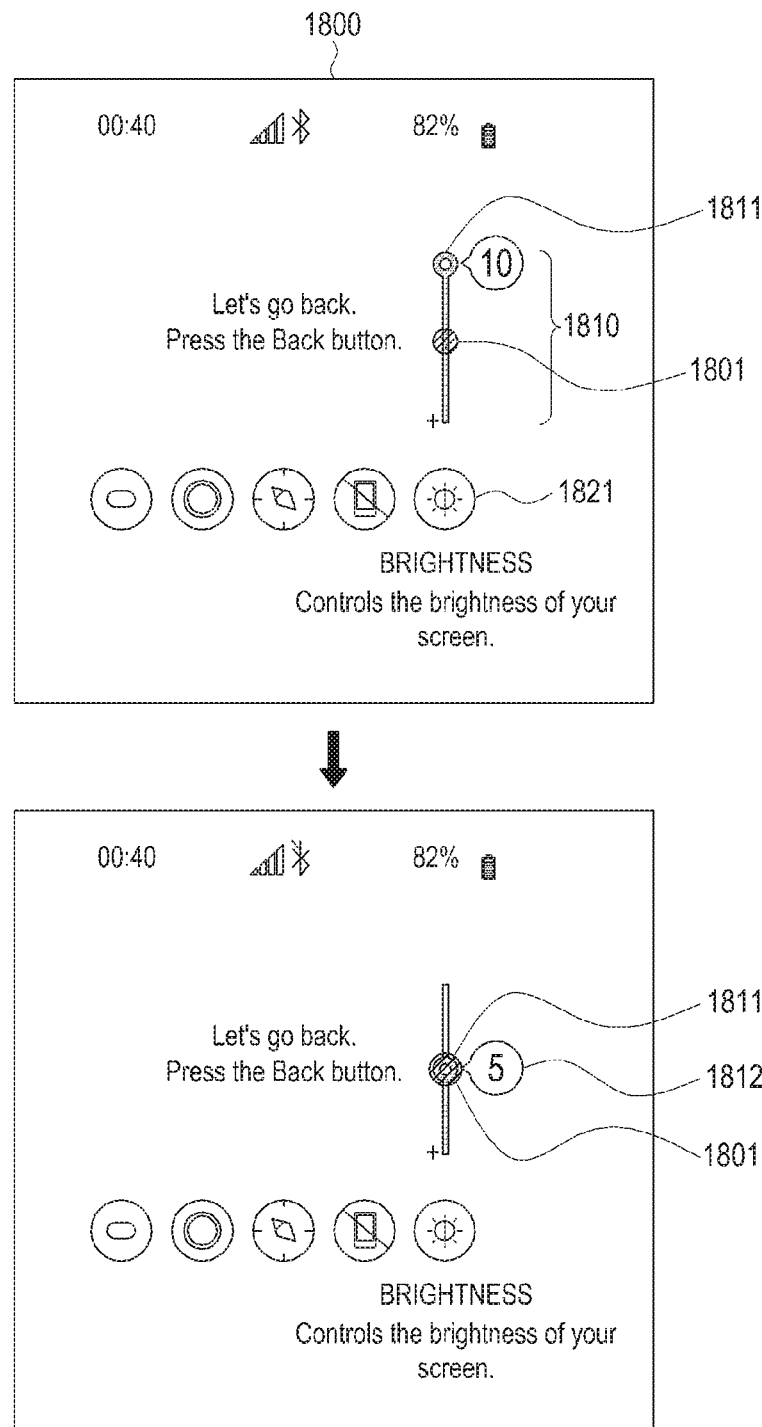
FIG. 18 illustrates when a displayed object is moved, according to an embodiment of the present disclosure.

FIG. 18 illustrates when a displayed object is moved, according to an embodiment of the present disclosure.

Referring to FIG. 18, the electronic device may output a screen 1800 for setting functions of the display. For example, the setting screen 1800 may include a button 1821 for setting brightness.

When the brightness setting button 1821 is selected, the electronic device may output a progress bar 1810 for adjusting brightness. The progress bar 1810 may include a first object 1811 indicating a brightness level and a pointer object 1801 moving as the electronic device moves.

According to an embodiment of the present disclosure, the first object 1811 of the progress bar area 1810 may be moved into the position of the pointer object 1801 as the electronic device moves.

The user may fasten the pointer object 1801 into a position 1812 corresponding to a first brightness level, such as level 5, for a predetermined time. For example, the electronic device may identify the brightness level at which the movement of the pointer object 1801 is fastened and may move the first object 1811 into the position 1812 corresponding to the identified first brightness level.

When a predetermined time elapses after the first object 1811 has moved into the position 1812 corresponding to the first brightness level, the electronic device may control the display so that the brightness of the display is set to the first brightness level.

Figure 19:
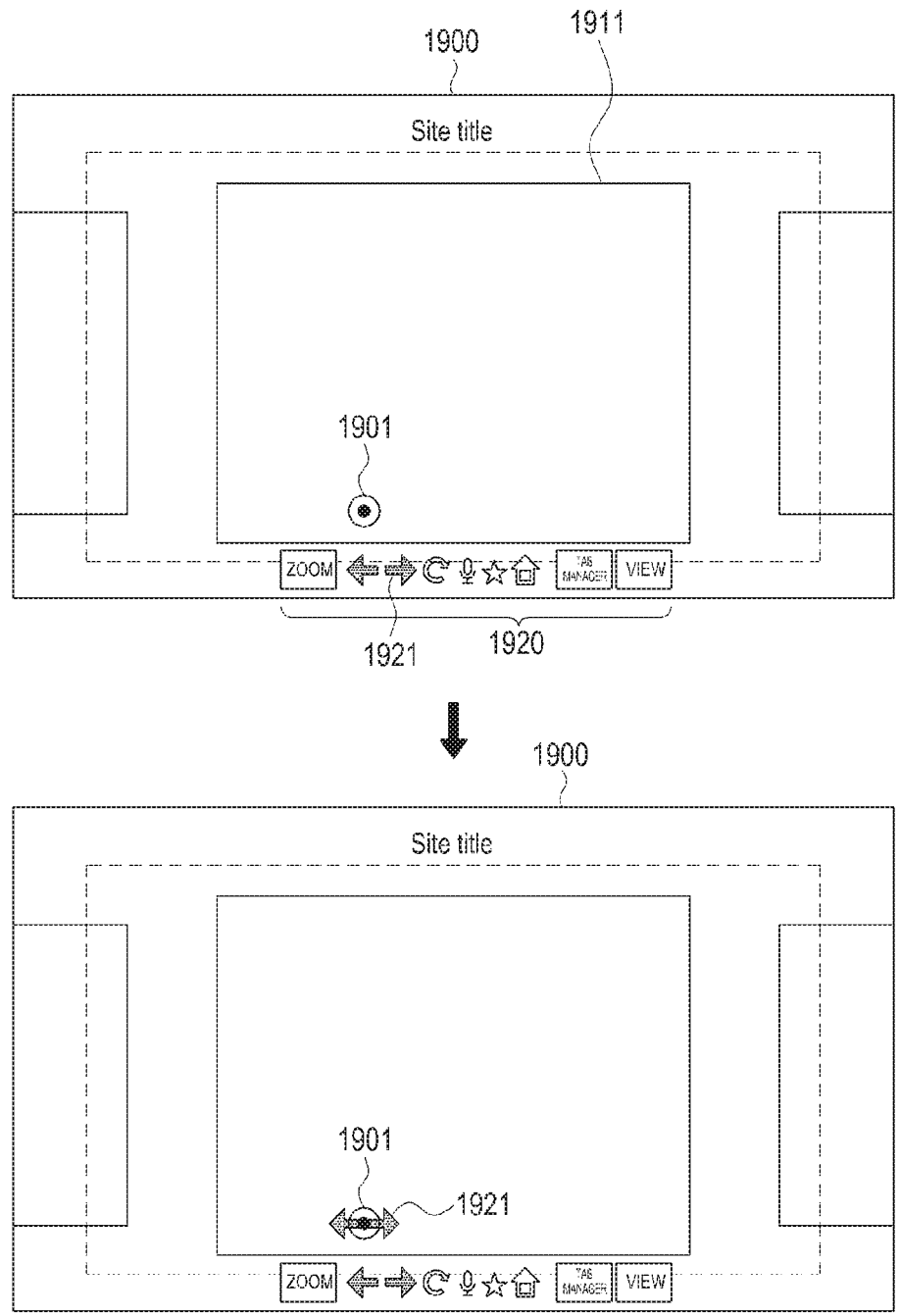
FIG. 19 illustrates an example of an application execution screen where a displayed object is moved, according to an embodiment of the present disclosure.

FIG. 19 illustrates an example of an application execution screen where a displayed object is moved, according to an embodiment of the present disclosure.

Referring to FIG. 19, the electronic device may output an execution screen 1900 of a web browser application. For example, the execution screen 1900 may include at least one webpage (e.g., a first webpage 1911), a button area 1920 for controlling functions related to the outputted webpage, and a pointer object 1901 moving as the user moves.

According to an embodiment of the present disclosure, when the pointer object 1901 remains on at least a portion of the area of the first webpage 1911 for a predetermined time, the electronic device may identify a left-right scroll button 1921 designated for where the pointer object 1901 has a fixed position for a predetermined time, and may move the left-right scroll button 1921 into the pointer object 1901.

For example, the user may designate an application displaying a list of thumbnail images or webpages, for an application where a preset object moves into the position of the pointer object 1901, and other objects may be positioned at left and right sides to implement various applications requiring the left-right scroll button 1921. The electronic device may move an object which is positioned in line with the pointer object 1911 in an upward, downward, right, or left direction, into the position of the pointer object 1911.

According to an embodiment of the present disclosure, the electronic device may perform control to output a prior or subsequent webpage with respect to the first webpage 1911 according to the left or right movement of the electronic device, with the left-right scroll button 1921 relocated into the pointer object 1901.

Figure 20:
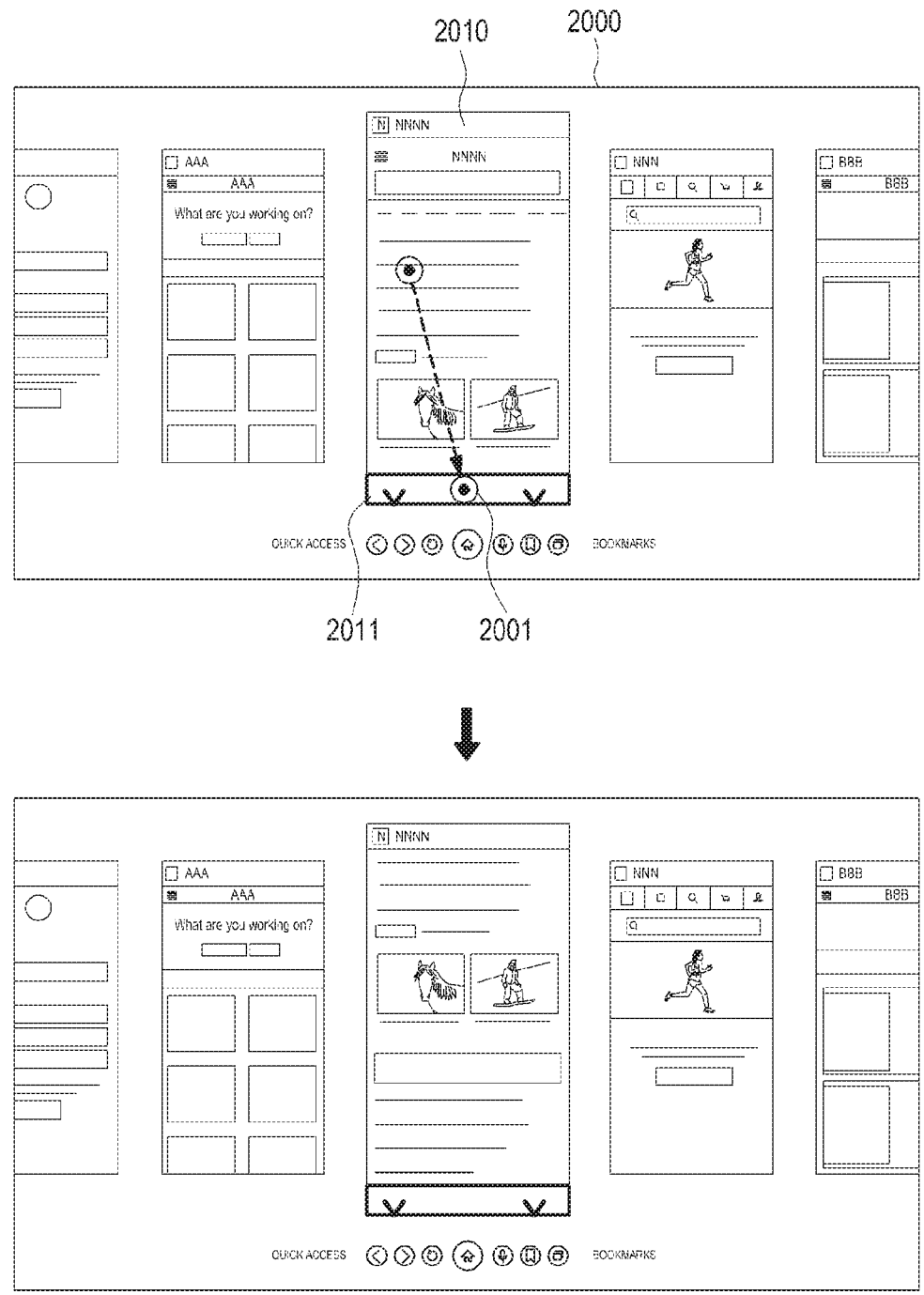
FIG. 20 illustrates an example of an application execution screen where a displayed object is moved, according to an embodiment of the present disclosure.

FIG. 20 illustrates an example of an application execution screen where a displayed object is moved, according to an embodiment of the present disclosure.

Referring to FIG. 20, the electronic device may output, through a displayed screen 2000, an execution screen (e.g., a first webpage 2010) of a web browser application having run for a predetermined time or a pointer object 2001 moving as the electronic device moves.

According to an embodiment of the present disclosure, when the pointer object 2001 remains in a designated area in the area of the first webpage 2010 for a predetermined time, the electronic device may output an upper-lower scroll button 2011 and move the pointer object 2001 into the designated object. For example, the designated area in the area of the first webpage 2010 may be a character data-free portion of the area of the first webpage 2010 or an advertisement data-displayed portion of the area of the first webpage 2010.

According to an embodiment of the present disclosure, while the pointer object 2001 is positioned on the upper-lower scroll button 2011, the electronic device may perform control to output an upper or lower portion of the first webpage 2010 as the electronic device moves up or down.

Figure 21:
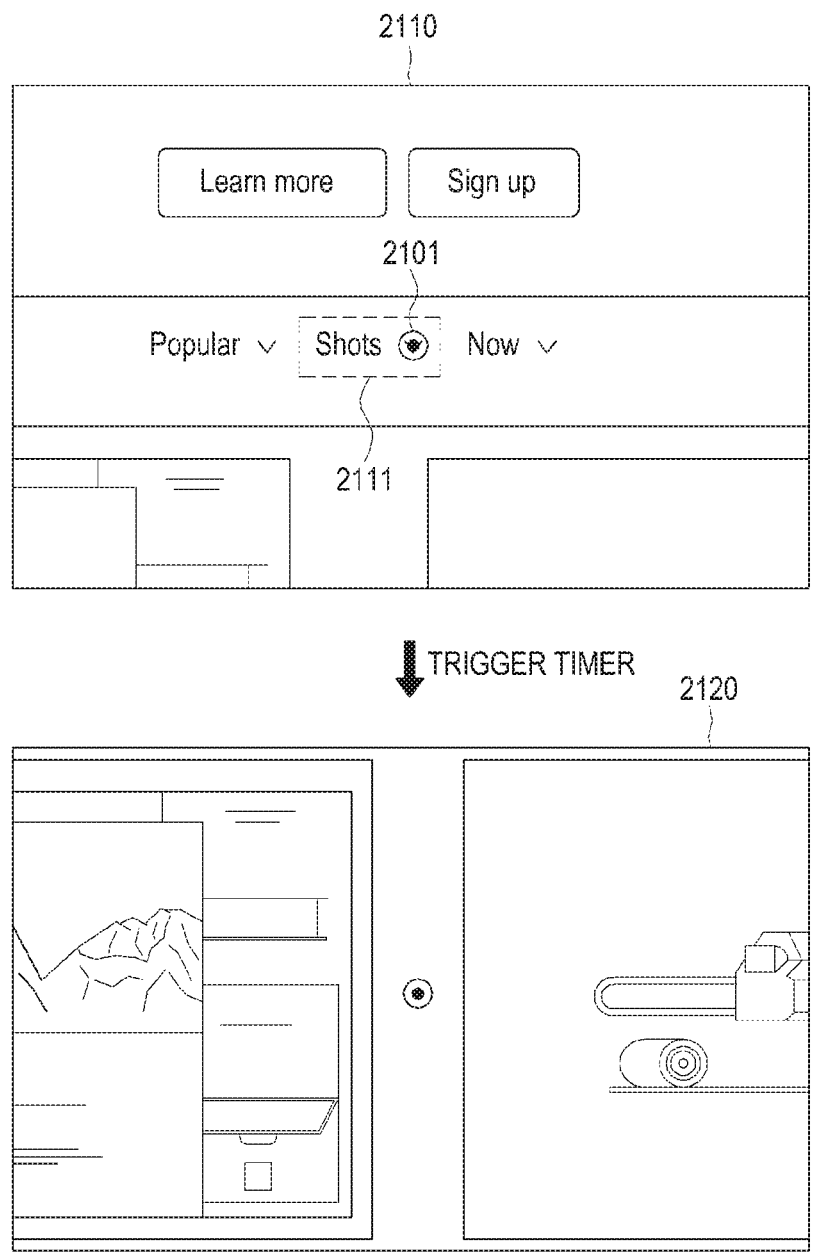
FIG. 21 illustrates when a displayed object is run, according to an embodiment of the present disclosure.

FIG. 21 illustrates when a displayed object is run, according to an embodiment of the present disclosure.

Referring to FIG. 21, the electronic device may output a stereoscopic image 2110 through a display. For example, a pointer object 2101 moving as the electronic device moves may be outputted on the stereoscopic image 2110.

The electronic device may identify the position of the pointer object 2101 and trigger a timer. For example, the timer may determine whether the pointer object 2101 has a fixed position for a predetermined time.

According to an embodiment of the present disclosure, when the pointer object 2101 has a fixed position in the area of a first object 2111, the electronic device may perform a function related to the first object 2111. For example, a function (e.g., "shots") showing pictures captured for the first object may be designated, and the electronic device may output a screen 2120 including the captured pictures, as shown in the lower image of FIG. 21.

Figure 22:
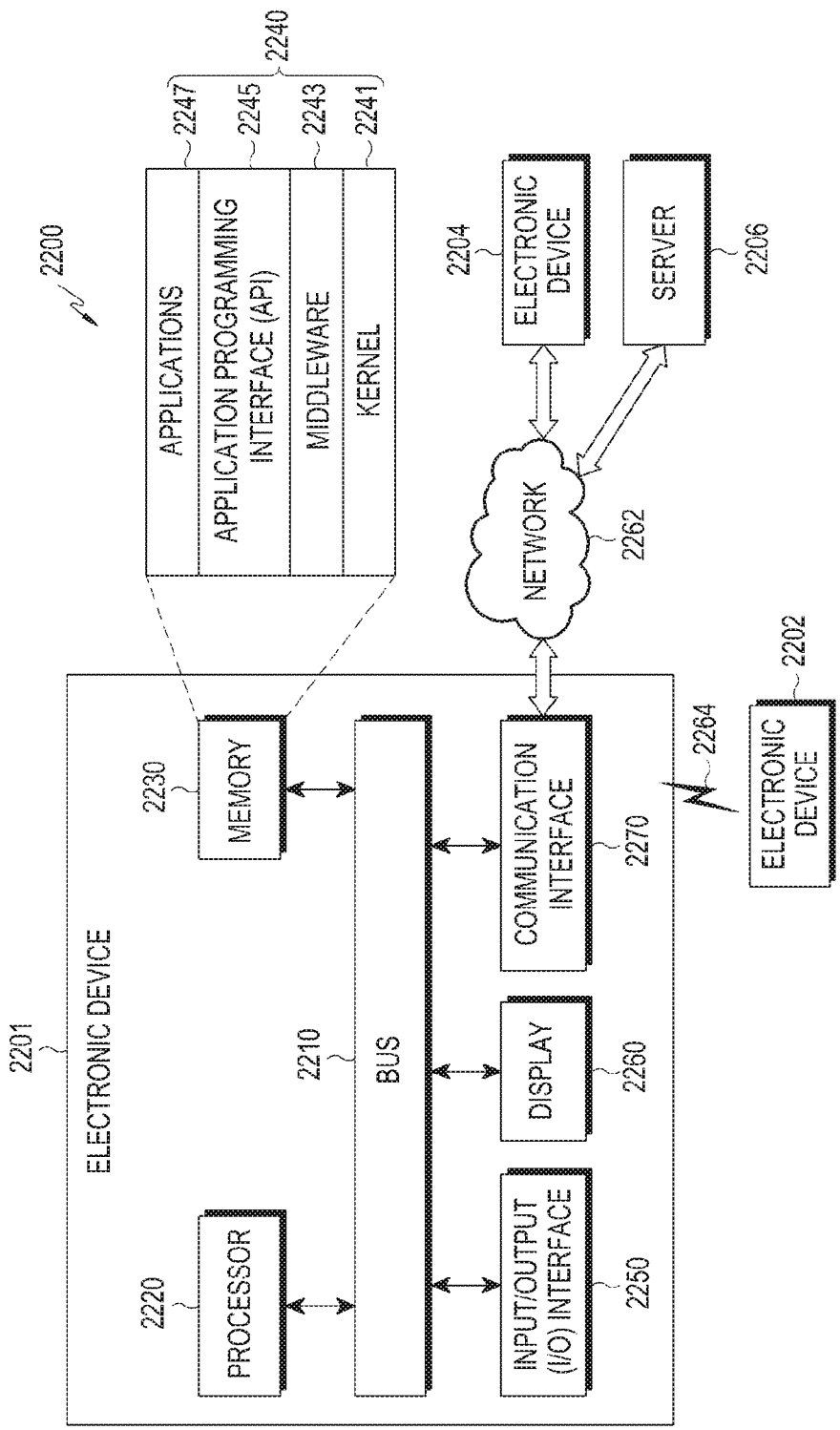
FIG. 22 illustrates an example network environment, according to an embodiment of the present disclosure.

FIG. 22 illustrates an example network environment, according to an embodiment of the present disclosure.

Referring to FIG. 22, the network environment 2200 may include an electronic device 2201, at least one of a first electronic device 2202 and a second electronic device 2204, and a server 2206, and each of the components may be connected with the electronic device 2201 through a network 2262 or through a communication interface 2270 of the electronic device 2201.

The electronic device 2201 may include a bus 2210, a processor 2220, a memory 2230, an input/output interface 2250, a display 2260, and the communication interface 2270. In some embodiments, the electronic device 2201 may exclude at least one of the components or may add another component.

The bus 2210 may include a circuit for connecting the components 2220 to 2270 with one another and transferring communications (e.g., control messages and/or data) between the components.

The processing module 2220 may include one or more of a central processing unit (CPU), an application processor (AP), and a communication processor (CP). The processor 2220 may perform control on at least one of the other components of the electronic device 2201, and/or perform an operation or data processing relating to communication.

The memory 2230 may include a volatile and/or non-volatile memory. For example, the memory 2230 may store commands or data related to at least one other component of the electronic device 2201. According to an embodiment of the present disclosure, the memory 2230 may store software and/or a program 2240 including a kernel 2241, middleware 2243, an application programming interface (API) 2245, and/or applications 2247. At least a portion of the kernel 2241, middleware 2243, or API 2245 may be denoted an operating system (OS).

For example, the kernel 2241 may control or manage system resources (e.g., the bus 2210, processor 2220, or memory 2230) used to perform operations or functions implemented in other programs. The kernel 2241 may provide an interface that allows the middleware 2243, the API 2245, or the applications 2247 to access the individual components of the electronic device 2201 to control or manage the system resources.

The middleware 2243 may function as a relay to allow the APT 2245 or the applications 2247 to communicate data with the kernel 2241, for example.

The middleware 2243 may process one or more task requests received from the applications 2247 in order of priority. For example, the middleware 2243 may assign at least one of the applications 2247 with priority of using system resources of at least one electronic device 2201. For example, the middleware 2243 may perform scheduling or load balancing on the one or more task requests by processing the one or more task requests according to the priority assigned to the at least one application program 147.

The API 2245 enables the applications 2247 to control functions provided from the kernel 2241 or the middleware 2243. For example, the API 133 may include at least one interface or function for filing control, window control, image processing or text control.

The input/output interface 2250 may serve as an interface that may transfer commands or data input from a user or other external devices to other component(s) of the electronic device 2201, and may output commands or data received from other component(s) of the electronic device 2201 to the user or the other external device.

The display 2260 may include a liquid crystal display (LCD), a light emitting diode (LED) display, an organic light emitting diode (OLED) display, or a microelectromechanical systems (MEMS) display, or an electronic paper display. The display 2260 may display various contents such as text, images, videos, icons, and symbols to the user. The display 2260 may include a touchscreen and may receive a touch, gesture, proximity or hovering input using an electronic pen or a body portion of the user.

For example, the communication module 2270 may set up communication between the electronic device 2201 and an external device (e.g., a first electronic device 2202, a second electronic device 2204, or a server 2206). For example, the communication module 2270 may be connected with the network 2262 through wireless or wired communication to communicate with the external electronic device.

The wireless communication may use at least one of long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM), as a cellular communication protocol, and may include short-range communication 2264, such as wireless fidelity (Wi-Fi), Bluetooth®, near-field communication (NFC), or global navigation satellite system (GNSS), such as global positioning system (GPS), Beidou navigation satellite system (Beidou) or Galileo, or the European global satellite-based navigation system. The terms "GPS" and "GNSS" may be interchangeably used herein. The wired connection may include at least one of universal serial bus (USB), high definition multimedia interface (HDMI), recommended standard (RS)-232, or plain old telephone service (POTS). The network 2262 may include at least one of communication networks, such as a computer network (e.g., local area network (LAN) or wide area network (WAN)), the Internet, or a telephone network.

The first and second external electronic devices 2202 and 2204 each may be the same type as or a different type than the electronic device 2201. According to an embodiment of the present disclosure, the server 2206 may include a group of one or more servers. All or some of operations executed on the electronic device 2201 may be executed on another or multiple other electronic devices. When the electronic device 2201 should perform some function or service automatically or at a request, the electronic device 2201, instead of executing the function or service by itself or additionally, may request another device to perform at least some functions associated therewith. The other electronic device, such as electronic devices 2202 and 2204 or server 2206, may execute the requested functions or additional functions and transfer a result of the execution to the electronic device 2201. The electronic device 2201 may provide a requested function or service by processing the received result as it is or additionally. To that end, a cloud computing, distributed computing, or client-server computing technique may be used, for example.

Figure 23:
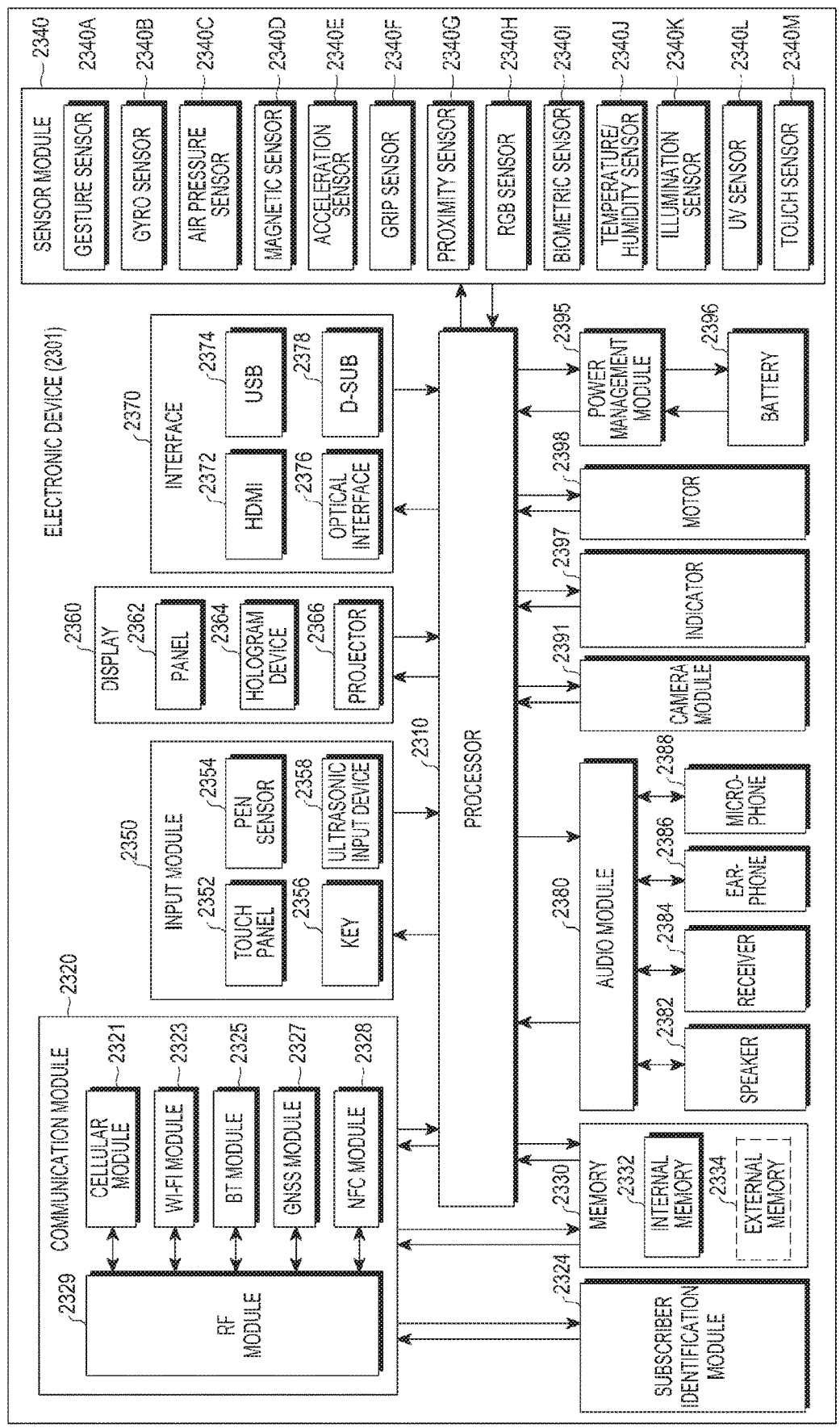
FIG. 23 illustrates a configuration of an electronic device, according to an embodiment of the present disclosure.

FIG. 23 illustrates a configuration of an electronic device, according to an embodiment of the present disclosure.

Referring to FIG. 23, the electronic device 2301 may include all or part of the configuration of the electronic device 2201 shown in FIG. 22. The electronic device 2301 may include one or more application processors (APs) 2310, a communication module 2320, a subscriber identification module (SIM) 2324, a memory 2330, a sensor module 2340, an input module 2350, a display 2360, an interface 2370, an audio module 2380, a camera module 2391, a power management module 2395, a battery 2396, an indicator 2397, and a motor 2398.

The processor 2310 may control multiple hardware and software components connected to the processor 2310 by running an operating system or application programs, and may process and compute various data. The processor 2310 may be implemented in a system on chip (SoC). According to an embodiment of the present disclosure, the processor 2310 may further include a graphic processing unit (GPU) and/or an image signal processor, and may include at least some of the components shown in FIG. 23. The processor 2310 may load a command or data received from a non-volatile memory on a volatile memory, process the command or data, and store various data in the non-volatile memory.

The communication module 2320 may have the same or similar configuration to the communication module 2270 of FIG. 22. The communication module 2320 may include a cellular module 2321, a Wi-Fi module 2323, a Bluetooth® module 2325, a GNSS module 2327, an NFC module 2328, and a radio frequency (RF) module 2329.

The cellular module 2321 may provide voice call, video call, text, or Internet services through a communication network. The cellular module 2321 may perform identification or authentication on the electronic device 2301 in the communication network using the SIM card 2324. According to an embodiment of the present disclosure, the cellular module 2321 may perform at least some of the functions providable by the processor 2310, and may include a communication processor (CP).

The Wi-Fi module 2323, the Bluetooth (BT) module 2325, the GNSS module 2327, or the NFC module 2328 may include a process for processing data communicated through the module. At least two of the cellular module 2321, the Wi-Fi module 2323, the Bluetooth module 2325, the GNSS module 2327, and the NFC module 2328 may be included in a single integrated circuit (IC) or an IC package.

The RF module 2329 may communicate data, such as RF signals, and may include a transceiver, a power amp module (PAM), a frequency filter, a low noise amplifier (LNA), and an antenna. According to an embodiment of the present disclosure, at least one of the cellular module 2321, the Wi-Fi module 2323, the Bluetooth module 2325, the GNSS module 2327, and the NFC module 2328 may communicate RF signals through a separate RF module.

The subscriber identification module 2324 may include a card including a subscriber identification module and/or an embedded SIM, and may contain unique identification information such as an integrated circuit card identifier (ICCID) or subscriber information such as an international mobile subscriber identity (IMSI).

The memory 2330 may include an internal memory 2332 and an external memory 2334. The internal memory 2332 may include at least one of a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 2334 may include a flash drive, such as a compact flash (CF) memory, a secure digital (SD) memory, a micro-SD memory, a min-SD memory, an extreme digital (xD) memory, a multi-media card (MMC), and a Memory Stick™. The external memory 2334 may be functionally and/or physically connected with the electronic device 2301 via various interfaces.

For example, the sensor module 2340 may measure a physical quantity or detect a motion state of the electronic device 2301, and may convert the measured or detected information into an electrical signal. The sensor module 2340 may include a gesture sensor 2340A, a gyro sensor 2340B, an atmospheric pressure sensor 2340C, a magnetic sensor 2340D, an acceleration sensor 2340E, a grip sensor 2340F, a proximity sensor 2340G, a color sensor 2340H such as a red-green-blue (RGB) sensor, a bio sensor 2340I, a temperature/humidity sensor 2340J, an illumination sensor 2340K, an ultra violet (UV) sensor 2340L, and a touch sensor 2340M. Additionally or alternatively, the sensing module 2340 may include an e-nose sensor, an electromyography (EMG) sensor, an electroencephalogram (EEG) sensor, an electrocardiogram (ECG) sensor, an infrared (IR) sensor, an iris sensor, or a finger print sensor, and may further include a control circuit for controlling at least one or more of the sensors included in the sensing module. According to an embodiment of the present disclosure, the electronic device 2301 may further include a processor configured to control the sensor module 2340 as part of or separately from the processor 2310, and the electronic device 2301 may control the sensor module 2340 while the processor 2310 is in a sleep mode.

The input unit 2350 may include a touch panel 2352, a (digital) pen sensor 2354, a key 2356, and an ultrasonic input device 2358. The touch panel 2352 may use at least one of capacitive, resistive, infrared, or ultrasonic methods, and may further include a control circuit and a tactile layer that provides a user with a tactile reaction.

The (digital) pen sensor 2354 may include a part of a touch panel or a separate sheet for recognition. The key 2356 may include a physical button, optical key or keypad. The ultrasonic input device 2358 may sense an ultrasonic wave generated from an input tool through a microphone 2388 to identify data corresponding to the sensed ultrasonic wave.

The display 2360 may include a panel 2362, a hologram device 2364, and a projector 2366. The panel 2362 may have the same or similar configuration to the display 2260 of FIG. 22 and may be implemented to be flexible, transparent, or wearable. The panel 2362 may also be incorporated with the touch panel 2352 in a module. The hologram device 2364 may project three dimensional (3D) images (holograms) in the air by using light interference. The projector 2366 may display an image by projecting light onto a screen, which may be located inside or outside of the electronic device 2301. In accordance with an embodiment, the display 2360 may further include a control circuit to control the panel 2362, the hologram device 2364, or the projector 2366.

The interface 2370 may include, e.g., a high definition multimedia interface (HDMI) 2372, a USB 2374, an optical interface 2376, or a D-subminiature (D-sub) 2378. The interface 2370 may be included in the communication module 2270 shown in FIG. 22. Additionally or alternatively, the interface 2370 may include a mobile high-definition link (MHL) interface, a secure digital (SD) card/multimedia card (MMC) interface, or infrared data association (IrDA) standard interface.

The audio module 2380 may convert a sound into an electric signal or vice versa, for example. At least a part of the audio module 2380 may be included in e.g., the input/output interface 2245 as shown in FIG. 22. The audio module 2380 may process sound information input or output through a speaker 2382, a receiver 2384, an earphone 2386, or the microphone 2388.

For example, the camera module 2391 may record still images and videos, and may include one or more image sensors (e.g., front and back sensors), a lens, an Image signal processor (ISP), or a flash such as a light-emitting diode (LED) or xenon lamp.

The power manager module 2395 may manage power of the electronic device 2301, for example, and may include a power management Integrated circuit (PMIC), a charger IC, or a battery gauge. The PMIC may have a wired and/or wireless recharging scheme. The wireless charging scheme may include a magnetic resonance scheme, a magnetic induction scheme, or an electromagnetic wave based scheme, and an additional circuit, such as a coil loop, a resonance circuit, or a rectifier, may be added for wireless charging. The battery gauge may measure an amount of remaining power of the battery 2396, a voltage, a current, or a temperature while the battery 2396 is being charged. The battery 2396 may include a rechargeable battery or a solar battery.

The indicator 2397 may indicate a particular state of the electronic device 2301 or a part of the electronic device, such as a booting, message, or recharging state. The motor 2398 may convert an electric signal to a mechanical vibration and may generate a vibrational or haptic effect. A processing unit for supporting mobile TV, such as a GPU may be included in the electronic device 2301. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device.

The electronic device in accordance with embodiments of the present disclosure may include at least one of the aforementioned components, omit some of the components, or include additional component(s). Some of the components may be combined into an entity, but the entity may perform the same functions as the components.

Figure 24:
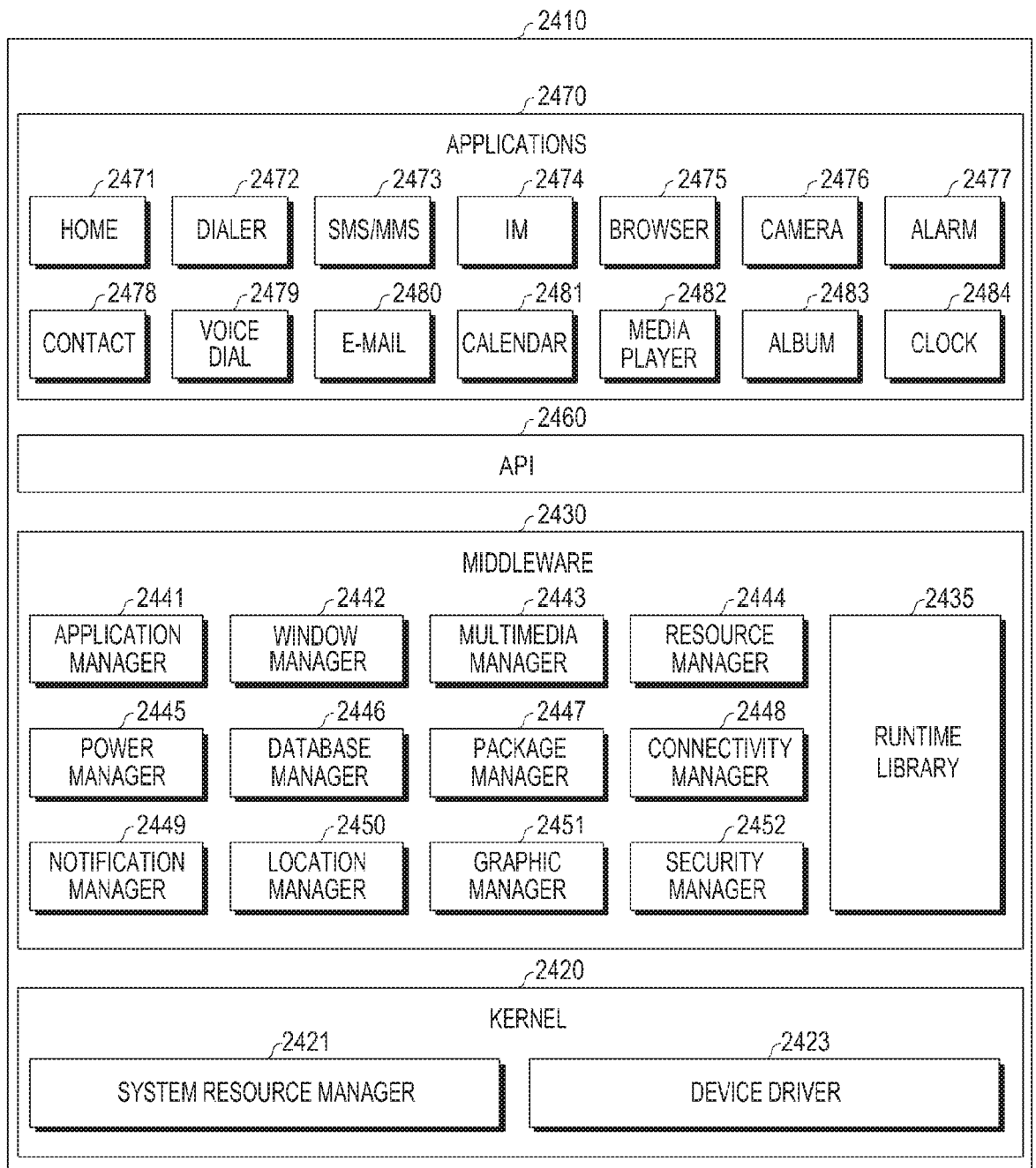
FIG. 24 illustrates an example program module structure, according to an embodiment of the present disclosure.

FIG. 24 illustrates an example program module structure, according to an embodiment of the present disclosure.

The program module 2410 may include an operating system (OS) controlling resources related to the electronic device 2201 and/or various applications 2247 driven on the operating system.

The operating system may include Android, iOS, Windows, Symbian, Tizen, or Bada.

The program 2410 may include a kernel 2420, middleware 2430, an application programming interface (API) 2460, and/or applications 2470. At least a part of the program module 2410 may be preloaded on the electronic device or may be downloaded from an external electronic device.

The kernel 2420 may include a system resource manager 2421 and/or a device driver 2423. The system resource manager 2421 may perform control, allocation, or recovery of system resources, and may include a process managing unit, a memory managing unit, or a file system managing unit. The device driver 2423 may include a display driver, a camera driver, a Bluetooth driver, a shared memory driver, a USB driver, a keypad driver, a Wi-Fi driver, an audio driver, or an inter-process communication (IPC) driver.

The middleware 2430 may provide various functions to the application 2470 through the API 2460 so that the application 2470 may efficiently use limited system resources in the electronic device or provide functions jointly required by applications 2470. According to an embodiment of the present disclosure, the middleware 2430 may include at least one of a runtime library 2435, an application manager 2441, a window manager 2442, a multimedia manager 2443, a resource manager 2444, a power manager 2445, a database manager 2446, a package manager 2447, a connectivity manager 2448, a notification manager 2449, a location manager 2450, a graphic manager 2451, and a security manager 2452.

The runtime library 2435 may include a library module used by a compiler in order to add a new function through a programming language while the application 2470 being executed. The runtime library 2435 may perform input/output management, memory management, or operation on arithmetic functions.

The application manager 2441 may manage the life cycle of at least one of the applications 2470. The window manager 2442 may manage GUI resources used on the screen. The multimedia manager 2443 may obtain formats necessary to play various media files and use a codec appropriate for a format to perform encoding or decoding on media files. The resource manager 2444 may manage resources, such as source code of at least one of the applications 2470, memory or storage space.

The power manager 2445 may operate together with a basic input/output system (BIOS) to manage battery or power and provide power information necessary for operating the electronic device. The database manager 2446 may generate, search, or vary a database to be used in at least one of the applications 2470. The package manager 2447 may manage installation or update of an application that is distributed in the form of a package file.

The connectivity manager 2448 may manage wireless connectivity, such as Wi-Fi or Bluetooth®. The notification manager 2449 may display or notify an event, such as an incoming message, appointment, or proximity notification, of the user without interfering with the user. The location manager 2450 may manage locational information on the electronic device. The graphic manager 2451 may manage graphic effects to be offered to the user and their related user interface. The security manager 2452 may provide various security functions necessary for system security or user authentication. According to an embodiment of the present disclosure, when the electronic device 2201 has telephony capability, the middleware 2430 may further include a telephony manager for managing voice call or video call functions of the electronic device.

The middleware 2430 may include a middleware module forming a combination of various functions of the above-described components, may provide a specified module per type of the operating system in order to provide a differentiated function, and may dynamically omit some existing components or add new components.

The API 2460 may be a set of API programming functions and may have different configurations depending on operating systems. For example, in the case of Android or iOS, one API set may be provided per platform, and in the case of Tizen, two or more API sets may be offered per platform.

The applications 2470 may include one or more applications that may provide functions such as, such as a home 2471, a dialer 2472, a short message service (SMS)/multimedia messaging service (MMS) 2473, an instant message (IM) 2474, a browser 2475, a camera 2476, an alarm 2477, a contact 2478, a voice dial 2479, an email 2480, a calendar 2481, a media player 2482, an album 2483, a clock 2484, a health-care (e.g., measuring the degree of a workout or blood sugar), or provision of environmental information such as air pressure, moisture, or temperature information.

According to an embodiment of the present disclosure, the applications 2470 may include an information exchanging application supporting information exchange between the electronic device 2201 and an external electronic device 2202 or 2204. Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, healthcare application, or environmental information application) to the external electronic device 2202 or 2204. The notification relay application may receive notification information from the external electronic device and may provide the received notification information to the user.

The device management application may perform at least some functions of the external electronic device 2202 or 2204 communicating with the electronic device, such as turning on/off the external electronic device or some components of the external electronic device, or control of brightness of the display, and the device management application may install, delete, or update an application operating in the external electronic device or a call service or message service provided from the external electronic device.

According to an embodiment of the present disclosure, the applications 2470 may include a health-care application of a mobile medical device designated according to an attribute of the external electronic device 2202 and 2204, an application received from the external electronic device 2202 and 2204, and a preloaded application or a third party application downloadable from a server. The names of the components of the program module 2410 according to the illustrated embodiment may be varied depending on the type of operating system.

According to an embodiment of the present disclosure, at least a part of the program module 2410 may be implemented in software, firmware, hardware, or in a combination of at least two thereof. At least a part of the programming module 2410 may be executed by a processor 2310, and may include e.g., a module, program, routine, set of instructions, or process for performing one or more functions.

The term 'module' may refer to a unit including one of hardware, software, and firmware, or a combination of at least two thereof. The term 'module' may be interchangeably used with a unit, logic, logical block, component, or circuit. The module may be a minimum unit or part of an integrated component or of performing one or more functions. The module may be implemented mechanically or electronically. For example, the module may include at least one of application specific integrated circuit (ASIC) chips, field programmable gate Arrays (FPGAs), or programmable logic arrays (PLAs) that perform some operations, which have already been known or will be developed in the future.

According to an embodiment of the present disclosure, at least a part of the device or method may be implemented as instructions stored in a computer-readable storage medium such as a program module. The instructions, when executed by a processor, may enable the processor to perform a corresponding function. The computer-readable storage medium may be the memory 2230.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, or flash memories. Examples of the program instructions may include not only machine language codes but also high-level language codes which are executable by various computing means using an interpreter. The aforementioned hardware devices may be configured to operate as one or more software modules to execute embodiments of the present disclosure, and vice versa.

Modules or program modules in accordance with embodiments of the present disclosure may include at least one of the aforementioned components, omit some of them, or further include additional components.

Operations performed by modules, programming modules or other components in accordance with embodiments of the present disclosure may be performed sequentially, simultaneously, repeatedly, or heuristically. Furthermore, some of the operations may be performed in a different order, or omitted, or may include additional operation(s).

The embodiments disclosed herein are disclosed for description and understanding of the disclosed technology and do not limit the scope of the present disclosure. Accordingly, the scope of the present disclosure should be interpreted as including all changes or embodiments based on the technical spirit of the present disclosure.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a display;
   a sensor that senses a movement of the electronic device; and
   a processor configured to:
   display a stereoscopic image including a left-eye image and a right-eye image through the display,
   move a pointer object in the stereoscopic image, based on the movement of the electronic device sensed by the sensor,
   identify whether the pointer object is positioned between a first position and a second position for a predetermined time in the stereoscopic image, based on information obtained from the sensor, the first position being a position at which a first object is positioned, the second position being a position at which a second object is positioned, and the first object and the second object being closest to the pointer object among a plurality of objects included in the stereoscopic image, after identifying that the pointer object is positioned between the first position and the second position for the predetermined time, determine a movement direction in which the pointer object has been moved before the pointer object is positioned between the first position and the second position, determine an object positioned in the movement direction among the first and second objects, and move the pointer object into a position of the determined object.

2. The electronic device of claim 1, wherein the processor is further configured to determine the object further based on at least one reference including at least one of distances between the pointer object and each of the first and second objects, importances of the first and second objects, or a connection attribute between the first object and the second object.

3. The electronic device of claim 2, wherein the processor is further configured to perform an operation designated for the first or second object when the pointer object remains in the first or second position for a predetermined time after the movement.

4. The electronic device of claim 2, wherein the processor is further configured to identify a distance between the pointer object and each of the first and second objects, and determine an object positioned closest to the pointer object among the first and second objects as an object into which the pointer object will move.

5. The electronic device of claim 1, wherein the processor is further configured to:

identify a user input entered through the electronic device other than the movement of the electronic device, and determine an object corresponding to the user input between the first object and the second object as an object into which the pointer object will move.

6. The electronic device of claim 1, wherein the processor is further configured to:

move a third object into a position of the pointer object when the pointer object is determined to be positioned in a preset area for a predetermined time, display the pointer object and the third object overlapping each other, perform control to move the pointer object and the third object overlapping each other according to the sensed movement, and perform an operation designated for the third object.

7. The electronic device of claim 1, wherein the processor is further configured to, when there is a fourth object moving in a predetermined action in the stereoscopic image, to move the fourth object into the position of the pointer object corresponding to the sensed movement.

8. A method for controlling a pointer object displayed through an electronic device, the method comprising:

outputting a stereoscopic image through a display of the electronic device;

moving the pointer object in the stereoscopic image, based on a movement of the electronic device sensed by a sensor of the electronic device;

identifying whether the pointer object is positioned between a first position and a second position for a predetermined time in the stereoscopic image, based on information obtained from the sensor, the first position being a position at which a first object is positioned, the second position being a position at which a second object is positioned, and the first object and the second object being closest to the pointer object among a plurality of objects included in the stereoscopic image;

after identifying that the pointer object is positioned between the first position and the second position for the predetermined time, determining a movement direction in which the pointer object has been moved before the pointer object is positioned between the first position and the second position;

determining an object positioned in the movement direction among the first and second objects; and moving the pointer object into a position of the determined object.

9. The method of claim 8, further comprising determining the object based on at least one reference including at least one of distances between the pointer object and each of the first and second objects, importances of the first and second objects, or a connection attribute between the first object and the second object.

10. The method of claim 9, further comprising performing an operation designated for the first or second object when the pointer object remains in the first or second position for a predetermined time after the movement.

11. The method of claim 9, further comprising:

identifying a distance between the pointer object and each of the first and second objects; and determining an object positioned closest to the pointer object among the first and second objects as an object into which the pointer object will move.

12. The method of claim 8, further comprising:

identifying a user input entered through the electronic device other than the movement of the electronic device; and determining an object corresponding to the user input between the first object and the second object as an object into which the pointer object will move.

13. The method of claim 8, further comprising:

moving a third object into a position of the pointer object when the pointer object determined to be positioned in a preset area for a predetermined time;

displaying the pointer object and the third object overlapping each other;

performing control to move the pointer object and the third object overlapping each other according to the sensed movement; and performing an operation designated for the third object.

14. The method of claim 8, further comprising, when there is a fourth object moving in a predetermined action in the stereoscopic image, moving the fourth object into the position of the pointer object corresponding to the sensed movement.

* * * * *